(12) United States Patent
Nakayama et al.

(10) Patent No.: US 11,328,174 B2
(45) Date of Patent: May 10, 2022

(54) CLUSTER CLASSIFICATION DEVICE, ENVIRONMENT GENERATION DEVICE, AND ENVIRONMENT GENERATION SYSTEM

(71) Applicant: DAIKIN INDUSTRIES, LTD., Osaka (JP)

(72) Inventors: Naoko Nakayama, Osaka (JP); Sanae Kagawa, Osaka (JP); Kazuyuki Satou, Osaka (JP); Ryuta Ueda, Tokyo (JP); Hideyuki Takahashi, Suita (JP); Hiroshi Ishiguro, Suita (JP); Midori Takama, Suita (JP); Yuichiro Yoshikawa, Suita (JP); Yutaka Nakamura, Suita (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/277,701

(22) PCT Filed: Sep. 30, 2019

(86) PCT No.: PCT/JP2019/038450
§ 371 (c)(1),
(2) Date: Mar. 18, 2021

(87) PCT Pub. No.: WO2020/067562
PCT Pub. Date: Apr. 2, 2020

(65) Prior Publication Data
US 2021/0312226 A1    Oct. 7, 2021

(30) Foreign Application Priority Data

Sep. 28, 2018 (JP) ................................. 2018-184268
Jan. 11, 2019 (JP) ................................. 2019-003122

(Continued)

(51) Int. Cl.
*G06K 9/00* (2006.01)
*G06K 9/62* (2022.01)
(Continued)

(52) U.S. Cl.
CPC ......... *G06K 9/6215* (2013.01); *G06F 16/906* (2019.01); *G06K 9/622* (2013.01); *G06T 19/20* (2013.01)

(58) Field of Classification Search
CPC .......... G06K 9/00718; G06K 9/00797; G06K 9/6217; G06K 9/03; G06K 9/38;
(Continued)

(56) References Cited

U.S. PATENT DOCUMENTS 5,682,573 A * 10/1997 Ishikawa ............... H04N 1/40
399/46
5,995,644 A * 11/1999 Lai ....................... G06K 9/3233
382/131
(Continued)

FOREIGN PATENT DOCUMENTS

CN       102067128 A       5/2011
CN       104238376 A      12/2014
(Continued)

OTHER PUBLICATIONS

International Search Report of corresponding PCT Application No. PCT/JP2019/038450 dated Nov. 19, 2019.
(Continued)

Primary Examiner — Amir Alavi
(74) Attorney, Agent, or Firm — Global IP Counselors, LLP

(57) ABSTRACT

A cluster classification device includes an environmental condition acquisition unit, a classification unit, and a storage unit. The environmental condition acquisition unit acquires an environmental condition in order to generate a specific
(Continued)

environment in a target space. The classification unit generates a cluster from a plurality of environmental conditions acquired by the environmental condition acquisition unit, based on features of the environmental conditions. The storage unit stores the cluster and a feature of the cluster in association with each other. An environment generation device generates, using an environmental condition classified by the cluster classification device, a predetermined environment in the target space. An environment generation system includes the cluster classification device and a control device that controls an environment generation device that generates a specific environment in the target space.

19 Claims, 18 Drawing Sheets

(30) Foreign Application Priority Data

Jan. 11, 2019 (JP) .................................. 2019-003123
Aug. 1, 2019 (JP) .................................. 2019-141942

(51) Int. Cl.
*G06F 16/906* (2019.01)
*G06T 19/20* (2011.01)

(58) Field of Classification Search
CPC ...... G06K 9/0083; G06K 9/4609; G06K 9/48; G06K 9/6215; G06K 9/622; G06F 17/30257; G06F 17/3024; G06F 17/3072; H04N 1/40062; G06T 2207/10016
See application file for complete search history.

(56) References Cited

U.S. PATENT DOCUMENTS

| | | | |
|---|---|---|---|
| 8,503,768 B2 * | 8/2013 | Zhang | G06K 9/00684 |
| | | | 382/159 |
| 8,558,921 B2 * | 10/2013 | Walker | H04N 5/23206 |
| | | | 348/231.3 |
| 10,121,078 B2 * | 11/2018 | Guissin | G06T 7/32 |
| 10,259,466 B2 * | 4/2019 | Memani | B60W 40/09 |
| 10,732,621 B2 * | 8/2020 | Celia | G05B 23/0289 |
| 2011/0106772 A1 | 5/2011 | Kawamura et al. | |
| 2014/0210800 A1 * | 7/2014 | Takimoto | G06F 16/58 |
| | | | 345/204 |
| 2015/0302123 A1 * | 10/2015 | Gloss | H04W 16/30 |
| | | | 703/13 |
| 2017/0316329 A1 * | 11/2017 | Toyama | G06N 20/00 |
| 2020/0124868 A1 * | 4/2020 | Carrascal De Las Heras | |
| | | | G16H 50/70 |

FOREIGN PATENT DOCUMENTS

| | | |
|---|---|---|
| CN | 105517222 A | 4/2016 |
| JP | 2003-299013 A | 10/2003 |
| JP | 2014-214975 A | 11/2014 |
| JP | 2016-23915 A | 2/2016 |

OTHER PUBLICATIONS

International Preliminary Report of corresponding PCT Application No. PCT/JP2019/038450 dated Apr. 8, 2021.

* cited by examiner

STORAGE UNIT

| NUMBER OF CLUSTER | FEATURE OF CLUSTER (SPECIFIC INFLUENCE) | ENVIRONMENTAL CONDITION ||||||
|---|---|---|---|---|---|---|---|
| | | NUMBER OF ENVIRONMENTAL CONDITION | TEMPERATURE | HUMIDITY | AUDIO | IMAGE | FREQUENCY |
| CLUSTER 1 | ENJOYABLE ENVIRONMENT | ENVIRONMENTAL CONDITION 1 | TEMPERATURE 1 | HUMIDITY 1 | AUDIO 1 | IMAGE 1 | --- |
| | | ENVIRONMENTAL CONDITION 2 | TEMPERATURE 2 | HUMIDITY 1 | AUDIO 2 | IMAGE 1 | --- |
| | | ENVIRONMENTAL CONDITION 3 | TEMPERATURE 1 | HUMIDITY 1 | AUDIO 2 | IMAGE 1 | --- |
| CLUSTER 2 | ENVIRONMENT THAT ENHANCES CONCENTRATION | ENVIRONMENTAL CONDITION 4 | TEMPERATURE 3 | HUMIDITY 1 | --- | IMAGE 2 | FREQUENCY 1 |
| | | ENVIRONMENTAL CONDITION 5 | TEMPERATURE 2 | HUMIDITY 1 | --- | IMAGE 2 | FREQUENCY 1 |
| | | ENVIRONMENTAL CONDITION 6 | TEMPERATURE 2 | HUMIDITY 2 | --- | IMAGE 2 | FREQUENCY 1 |
| CLUSTER 3 | ENVIRONMENT THAT ENCOURAGES OPENNESS | ENVIRONMENTAL CONDITION 7 | TEMPERATURE 2 | HUMIDITY 2 | AUDIO 4 | IMAGE 3 | --- |
| | | ENVIRONMENTAL CONDITION 8 | TEMPERATURE 1 | HUMIDITY 2 | AUDIO 4 | IMAGE 3 | --- |
| | | ENVIRONMENTAL CONDITION 9 | TEMPERATURE 1 | HUMIDITY 2 | AUDIO 3 | IMAGE 3 | --- |

FIG. 3

CLUSTER CLASSIFICATION DEVICE, ENVIRONMENT GENERATION DEVICE, AND ENVIRONMENT GENERATION SYSTEM

CROSS-REFERENCE TO RELATED APPLICATIONS

This U.S. National stage application claims priority under 35 U.S.C. § 119(a) to Japanese Patent Application Nos. 2018-184268, filed in Japan on Sep. 28, 2018, 2019-003122 and 2019-003123, filed Jan. 11, 2019, and 2019-141942, filed Aug. 1, 2019, the entire contents of which are hereby incorporated herein by reference.

BACKGROUND

Field of the Invention

The present disclosure relates to a cluster classification device, an environment generation device, and an environment generation system for generating an environment in a target space.

Background Information

Devices that reproduce environments experienced by persons have been developed. For example, Japanese Unexamined Patent Application Publication No. 2003-299013 discloses an experience information reproducing apparatus aiming to allow an event experienced by a person to be re-experienced by the person with realism.

SUMMARY

However, there is a large individual difference in how to feel about the environment. Thus, the technique described in Japanese Unexamined Patent Application Publication No. 2003-299013 does not necessarily make it possible to sufficiently reproduce such an environment that can evoke a sensation shared among a group of people.

A cluster classification device according to a first aspect comprises an environmental condition acquisition unit, a classification unit, and a storage unit. The environmental condition acquisition unit acquires an environmental condition for generating a specific environment in a target space. The classification unit generates a cluster from a plurality of environmental conditions acquired by the environmental condition acquisition unit, on the basis of features of the environmental conditions. The storage unit stores the cluster and a feature of the cluster in association with each other. Accordingly, it is possible to provide a cluster classification device that stores a cluster classified in accordance with a feature that evokes a sensation of a person.

A cluster classification device according to a second aspect is the cluster classification device according to the first aspect, further comprising a setting unit that sets the feature of the cluster. This configuration makes it possible to set, for environmental conditions classified into a plurality of clusters, the features of the clusters later.

A cluster classification device according to a third aspect is the cluster classification device according to the second aspect, further comprising a reaction acquisition unit that acquires a reaction of a person present in the target space. Further, the setting unit sets the feature of the cluster on the basis of the reaction acquired by the reaction acquisition unit. This configuration makes it possible to set the feature of the cluster that reflects the reaction of the person in the target space.

A cluster classification device according to a fourth aspect is the cluster classification device according to the first aspect, in which the environmental condition acquisition unit acquires an environmental condition for generating, in the target space, a defined environment having a concept that is defined in advance. This configuration makes it possible to cluster environmental conditions in association with the defined environment.

A cluster classification device according to a fifth aspect is the cluster classification device according to the fourth aspect, further comprising a reaction acquisition unit that acquires a reaction of a person present in the target space. Further, the classification unit classifies the environmental condition into a specific cluster in accordance with the concept of the defined environment and the reaction acquired by the reaction acquisition unit. This configuration makes it possible to set the feature of the cluster that reflects not only the concept of the defined environment but also the reaction of a person in the target space.

A cluster classification device according to a sixth aspect is the cluster classification device according to any one of the first to fifth aspects, in which the environmental condition is a parameter for characterizing a physical quantity that exerts a specific influence on a body and/or mind of a person. The use of the environmental condition makes it possible to generate an environment that exerts a specific influence on the body and/or mind of a person.

A cluster classification device according to a seventh aspect is the cluster classification device according to any one of the first to sixth aspects, in which the cluster is formed of a group of environmental conditions or a region including environmental conditions in a space expressed by n-dimensional information.

An environment generation device according to an eighth aspect generates, using an environmental condition classified by the cluster classification device according to any one of the first to seventh aspects, a specific environment in the target space. Accordingly, it is possible to provide an environment generation device that can generate, in a target space, an environment according to the feature of the cluster.

An environment generation system according to a ninth aspect includes the cluster classification device according to any one of the first to seventh aspects, and a control device. The control device controls an environment generation device that generates a specific environment in the target space. The control device includes an input unit and a control unit. The input unit receives an input corresponding to a feature of the cluster. The control unit controls the environment generation device in accordance with an environmental condition selected from a cluster corresponding to the feature of the cluster received by the input unit. The control device having this configuration can create an environment that exerts a specific influence on the body and/or mind of a person.

An environment generation system according to a tenth aspect is the environment generation system according to the ninth aspect, in which the control device further includes a selection unit that selects an environmental condition among environmental conditions belonging to the cluster. The control unit controls the environment generation device in accordance with the environmental condition selected by the selection unit. This configuration enables the control device to create a non-uniform environment.

An environment generation system according to an eleventh aspect is the environment generation system according to the tenth aspect, in which the selection unit selects another environmental condition belonging to the same cluster under a predetermined condition. This configuration enables the control device to avoid habituation of a user in the target space to the specific environment.

An environment generation system according to a twelfth aspect is the environment generation system according to the eleventh aspect, in which the control device further includes a reaction acquisition unit that acquires a reaction of a person present in the target space. The selection unit selects another environmental condition when the reaction acquired by the reaction acquisition unit does not satisfy a preset condition. This configuration enables the control device to change the environment in the target space to an environment according to the reaction of the user.

An environment generation system according to a thirteenth aspect is the environment generation system according to any one of the tenth aspect to the twelfth aspect, in which the control device further includes a priority determination unit. The priority determination unit determines a priority of the environmental conditions belonging to a cluster on the basis of the number of selections made by the selection unit and/or a reaction of a person present in the target space. The selection unit selects the environmental condition in accordance with the priority. This configuration makes it possible to create an environment that reflects the preference and/or the physical condition or the like of a user.

BRIEF DESCRIPTION OF DRAWINGS

FIG. 3 is a schematic diagram for describing information stored in a storage unit 21.

DETAILED DESCRIPTION OF EMBODIMENT(S)

Figure 1:
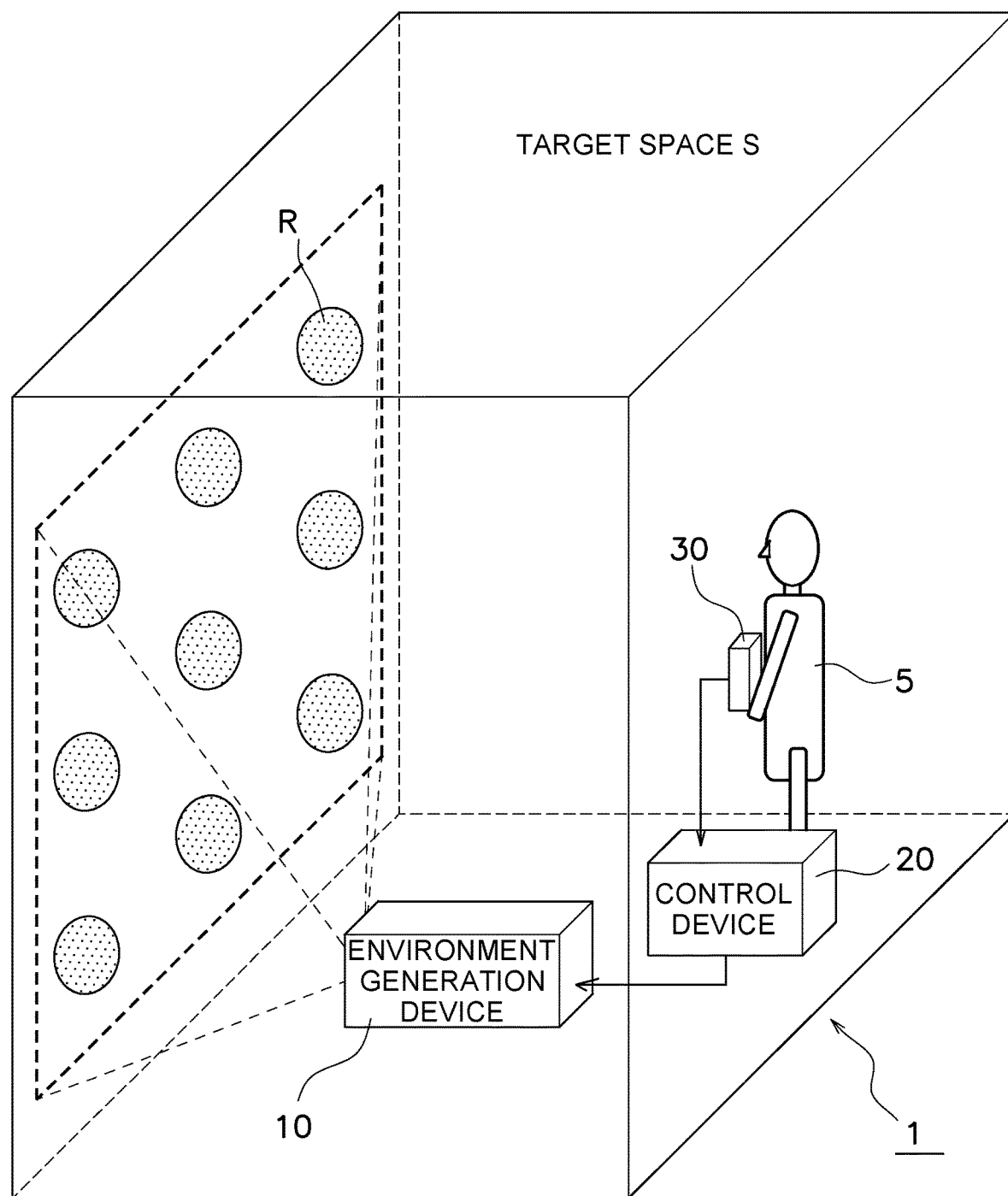
FIG. 1 is a schematic diagram for describing a configuration of an environment generation system 1.

(1) Environment Generation System (1-1) Configuration of Environment Generation System As illustrated in FIG. 1, an environment generation system 1 according to this embodiment includes an environment generation device 10 and a control device 20.

(1-1-1) Environment Generation Device

The environment generation device 10 is any device capable of generating a specific environment by changing an environment in a target space S. As a result of the environment generation device 10 changing the environment, a specific influence is exerted on the sensation of a user 5 in the target space S. Specifically, examples of a device that constitutes the environment generation device 10 include an air conditioner, a lighting device, a projector, a speaker, and an odor generator. For example, FIG. 1 illustrates how a projector serving as the environment generation device 10 projects a large number of display objects R onto a wall surface of the target space S to provide new appearance. In other words, in the example illustrated in FIG. 1, projection mapping changes the interior of the room. Alternatively, a robot may be placed in the target space S as the environment generation device 10. In this case, the robot changes at least a color of light to be emitted, a motion, a shape, and a sound.

Specifically, the environment generation device 10 generates a specific environment in the target space S in accordance with an environmental condition associated with a cluster described below.

The "environmental condition" is a parameter for characterizing a physical quantity that exerts a specific influence on the body and/or mind of a person. For example, an environmental condition is defined by a physical quantity (an example of a feature of the environmental condition), such as temperature, humidity, wind, image, video, audio, or frequency, and the device that constitutes the environment generation device 10 operates in accordance with the environmental condition. The environment generation device 10 changes the environment to exert a specific influence on the sensation of a person.

The "specific influence" refers to an action of evoking a specific sensation in the five senses of the user 5. Examples of the specific influence include any environmental changes that evoke sensations such as a fascinating feeling (a feeling that increases the sensitivity to sensations in daily life that a person is likely to forget), a tense feeling (a feeling that a person feels motivated by someone watching the person while the person is doing something), an embrace feeling (a feeling of warmth and serenity like embracing the mind), an open feeling (a feeling of taking a deep breath in a spacious place), a start feeling (a feeling of being cheered on when taking a new step), and a travel feeling (a feeling of being a bit anxious but romantic). The specific influence can be expressed in any language, and may be expressed in a generally conceivable term such as an "enjoyable environment", an "environment that enhances concentration", or an "environment that encourages openness". Alternatively, the specific influence may be expressed in a term that is not necessarily clear in concept, such as an "environment with an atmosphere like being in a blanket", an "environment with a party atmosphere", an "environment with a rainbow-colored atmosphere", or an onomatopoeic word or a mimetic word related to a tactile sensation, such as a smooth feel (slippery), a rough feel (coarse), or a soft feel (fluffy).

Note that the correspondence relationship between the specific influence and environmental conditions can be defined by aggregating impressions and the like felt by the user 5 present in the target space S.

(1-1-2) Control Device

Figure 2:
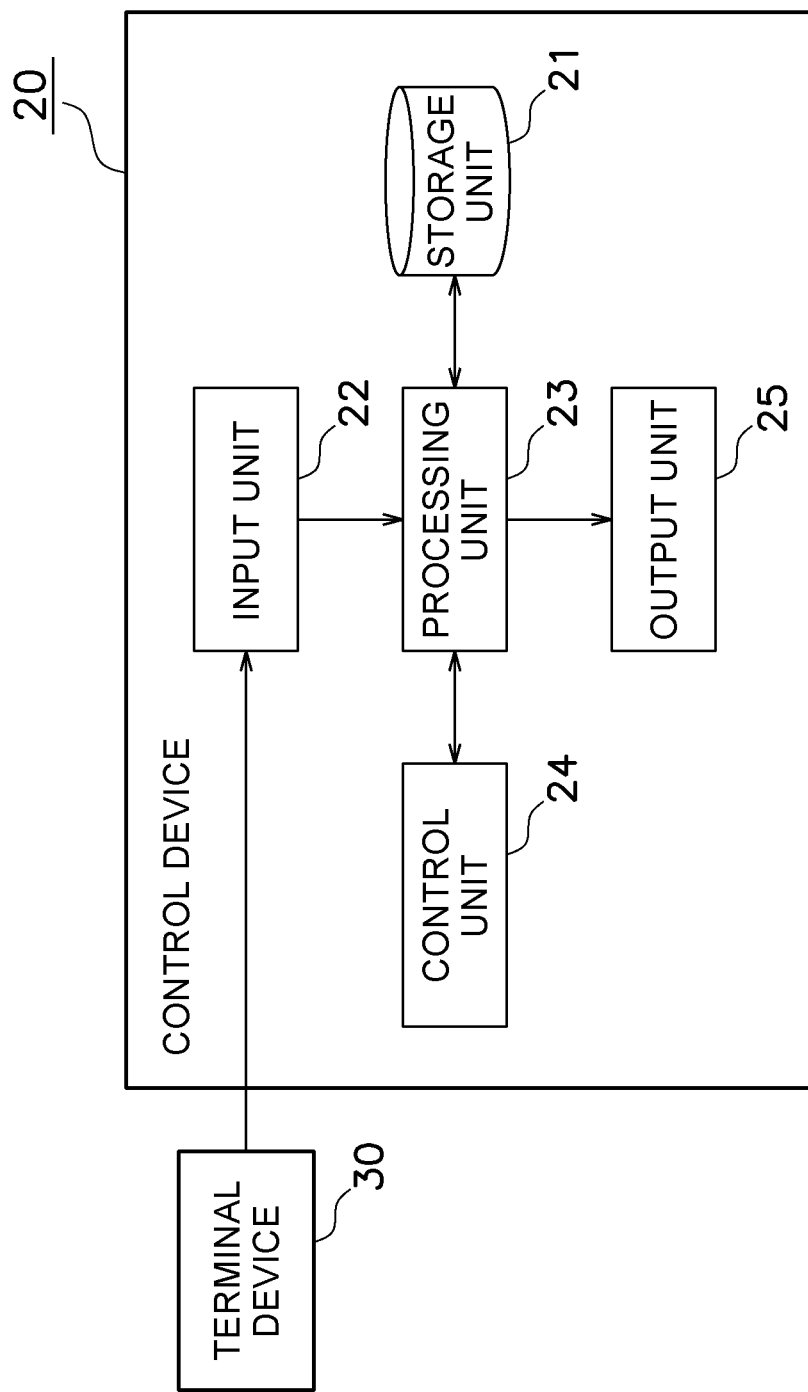
FIG. 2 is a schematic diagram for describing a configuration of a control device 20.

The control device 20 controls the environment generation device 10. The control device 20 can be implemented by any computer and, as illustrated in FIG. 2, includes a storage unit 21, an input unit 22, a processing unit 23, a control unit 24, and an output unit 25. The functions described above are implemented by loading a program stored in a storage device (such as a ROM or a RAM) into a CPU, a GPU, or the like of the computer. However, this is not limiting, and the control device 20 may be implemented as hardware by using an LSI (Large Scale Integration), an ASIC (Application Specific Integrated Circuit), an FPGA (Field-Programmable Gate Array), or the like.

The storage unit 21 is configured to store various types of information and is implemented by any storage device such as a memory or a hard disk. Here, the storage unit 21 stores a feature of a cluster and environmental conditions in association with each other. Specifically, a cluster is composed of a group of environmental conditions in a space represented by n-dimensional information (n is the number of parameters for the environmental conditions). Alternatively, a cluster is composed of a region including environmental conditions in a space represented by n-dimensional information. A unique feature is set for each cluster. For example, as illustrated in FIG. 3, the storage unit 21 stores information such as temperature, humidity, wind, image, video, audio, and frequency as n-dimensional information. These values are grouped into a cluster in accordance with a predetermined clustering method, and a feature of the cluster is set. The feature of the cluster, as used here, corresponds to the specific influence described above. In the example illustrated in FIG. 3, the "enjoyable environment" is set as the feature of cluster 1, the "environment that enhances concentration" is set as the feature of cluster 2, and the "environment that encourages openness" is set as the feature of cluster 3. A plurality of environmental conditions belong to each cluster. In the example illustrated in FIG. 3, environmental conditions 1 to 3 belong to the cluster 1, environmental conditions 4 to 6 belong to the cluster 2, and environmental conditions 7 to 9 belong to the cluster 3. It is also possible to further subdivide the clusters to define new clusters. In the example illustrated in FIG. 3, for example, when a new environmental condition 10 is added, the environmental conditions 7 and 8 among the environmental conditions 7 to 9 of the cluster 3 and the new environmental condition 10 may be used to define a new cluster. The new cluster may be tagged with a new feature such as a "bright environment".

The input unit 22 receives an input of various types of information via any terminal device 30 including a keyboard, a mouse, a touch panel, and so on. Here, the input unit 22 receives an input corresponding to a feature of a cluster. For example, the input unit 22 receives an input corresponding to a feature of one cluster from a list displayed in any form. The terminal device 30 may be a tactile sensation selection device 80 or an operation device 85 as an application of the tactile sensation selection device 80 illustrated in FIG. 16 to FIG. 18.

The processing unit 23 is configured to execute various information processing operations and is implemented by a processor, such as a CPU or a GPU, and a memory. Specifically, the processing unit (selection unit) 23 has a function of selecting one environmental condition among environmental conditions belonging to a cluster. More specifically, the processing unit 23 randomly selects another environmental condition belonging to the same cluster under a predetermined condition. When the predetermined condition is satisfied, the processing unit 23 changes the current environmental condition to the other environmental condition in the same cluster. Note that the predetermined condition refers to, for example, a state in which a predetermined time has elapsed or a state in which a predetermined reaction was not successfully obtained from the user 5 in the target space S.

The control unit 24 controls the environment generation device 10. Specifically, the control unit 24 extracts an environmental condition for controlling the environment generation device 10 from the storage unit 21 in accordance with the feature of the cluster described above, and controls the environment generation device 10 in accordance with the extracted environmental condition.

The output unit 25 outputs control information for controlling the environment generation device 10 in accordance with the output destination. For example, when the output destination is the terminal device 30 of the user 5, the output unit 25 outputs the control information converted into a display format corresponding to the user interface of the terminal device 30.

(1-2) Operation of Environment Generation System

Figure 4:
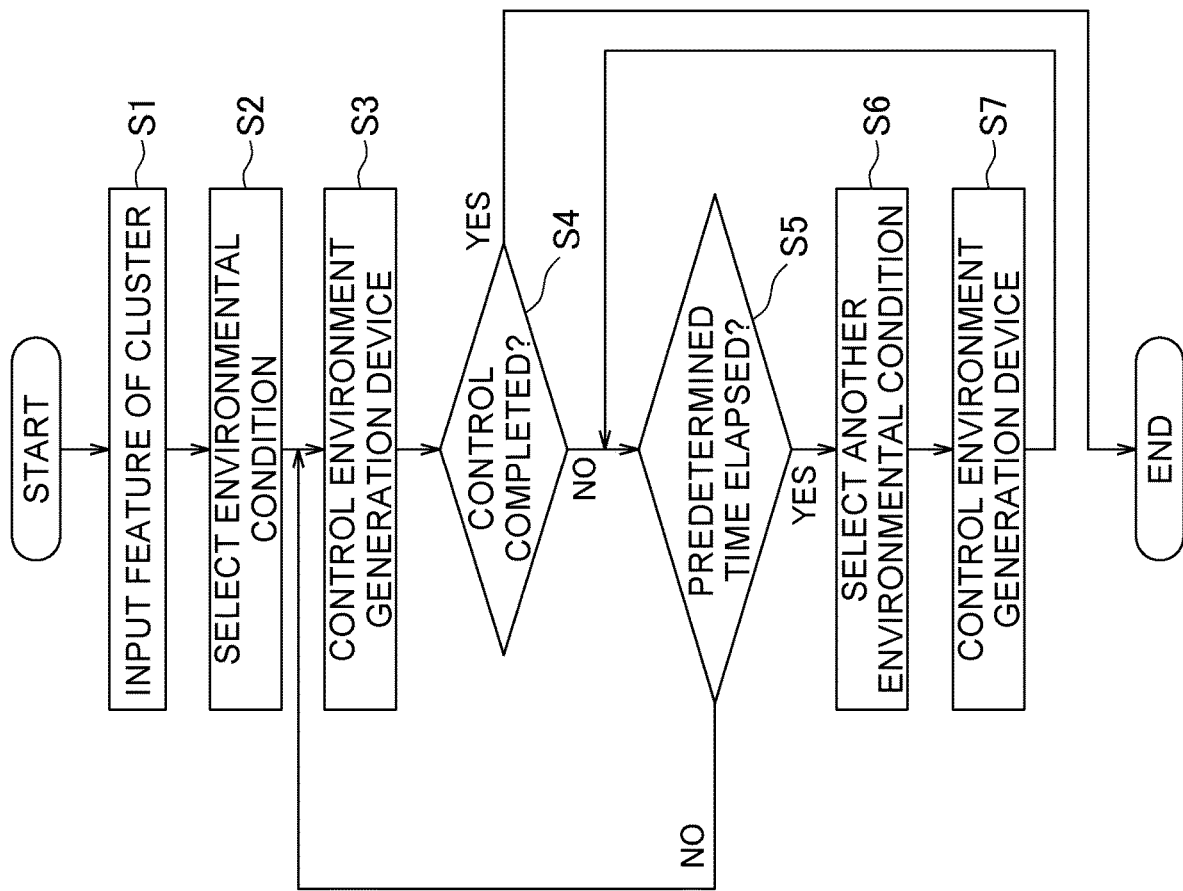
FIG. 4 is a flowchart for describing the operation of the environment generation system 1.

FIG. 4 is a flowchart for describing the operation of the environment generation system 1 according to this embodiment.

First, an input corresponding to a feature of a cluster for generating an environment in the target space S is received via the input unit 22 (S1). Here, a list such as a pull-down menu list in which a plurality of pieces of input information corresponding to features of clusters are defined in advance is displayed on the terminal device 30 of the user 5. Subsequently, the user 5 selects a piece of input information corresponding to a feature of one cluster from within the list via the terminal device 30. In the example corresponding to FIG. 3, the list shows the "enjoyable environment", the "environment that enhances concentration", the "environment that encourages openness", and so on in a selectable state. It is assumed here that the user 5 selects the "enjoyable environment" via the terminal device 30. As a result, the "enjoyable environment" is input from the input unit 22 as the feature of the cluster.

Then, in response to receipt of the input corresponding to the feature of the cluster by the input unit 22, the processing unit 23 selects one environmental condition among the environmental conditions belonging to the cluster (S2). In the example corresponding to FIG. 3, the "environmental condition 1", the "environmental condition 2", and the "environmental condition 3" belong to the cluster 1 representing the "enjoyable environment", and one of the environmental conditions is randomly selected by the processing unit 23. It is assumed here that the processing unit 23 selects the "environmental condition 1".

Then, the control unit 24 controls the environment generation device 10 in accordance with the environmental condition selected by the processing unit 23 (S3). As a result, a specific environment is generated in the target space S. In the example illustrated in FIG. 3, the environment generation device 10 is controlled in accordance with the environmental condition 1.

Thereafter, the environment generation device 10 is controlled until the control of the environment generation device 10 is completed (S4). When a predetermined time has elapsed before the completion of the control of the environment generation device 10, the processing unit 23 selects another environmental condition belonging to the same cluster (S4—No, S5—Yes, S6). In the example corresponding to FIG. 3, one environmental condition among the other environmental conditions belonging to the same cluster 1, namely, the "environmental condition 2" and the "environmental condition 3", is randomly selected by the processing unit 23. As a result, it is assumed here that the "environmental condition 2" is selected by the processing unit 23.

Then, the control unit 24 controls the environment generation device 10 in accordance with the other environmental condition selected by the processing unit 23 (S7). In the example corresponding to FIG. 3, the environment generation device 10 is controlled in accordance with the environmental condition 2. When the predetermined time has further elapsed, the environmental condition 2 is changed to the environmental condition 3, and the environment generation device 10 is controlled in accordance with the environmental condition 3.

(1-3) Features

As described above, the control device 20 according to this embodiment stores, in the storage unit 21, a plurality of clusters to which environmental conditions for creating environments that exert specific influences on the body and/or mind of a person belong and features of the clusters in association with each other. The control device 20 controls the environment generation device 10, which generates a specific environment in the target space S, in response to receipt of an input corresponding to a feature of a cluster. As a result, the control device 20 can create environments that can evoke various feelings in the user 5.

Further, the control device 20 according to this embodiment controls the environment generation device 10 in accordance with an environmental condition selected under a predetermined condition, making it possible to create a non-uniform environment. In particular, the processing unit (selection unit) 23 selects another environmental condition belonging to the same cluster under the predetermined condition, making it possible to avoid habituation of the user 5 to the specific environment in the target space S.

For example, with the use of the control device 20 according to this embodiment, when the environmental condition 1 for generating an "environment with an increased sense of exaltation" and the environmental condition 2 for generating an "environment with an increased feeling of happiness" belong to the cluster corresponding to the "enjoyable environment", the control device 20 appropriately switches the environmental condition 1 and the environmental condition 2, thereby making it possible to provide an environment that gives people not only a mere pleasant feeling but also an increased sense of exaltation or an increased feeling of happiness.

(1-4) Modifications (1-4-1) Modification A

In the foregoing description, the input unit 22 uses a list displayed in any form when receiving an input corresponding to a feature of a cluster, although the control device 20 according to this embodiment is not limited to this. For example, the input unit 22 may be configured to receive an input of text by the user 5 when receiving an input corresponding to a feature of a cluster. In this case, the processing unit 23 analyzes the text in accordance with a predetermined algorithm and sets a feature of a cluster from the input of the text by the user 5.

Alternatively, the input unit 22 may receive an input using an expression related to the sensations of a person, such as an onomatopoeic word or a mimetic word, including an onomatopoeic word or a mimetic word related to a tactile sensation. In this case, the processing unit 23 performs analysis in accordance with a predetermined algorithm and sets a feature of a cluster from the input of the sensation corresponding to the onomatopoeic word or mimetic word by the user 5.

(1-4-2) Modification B

In the foregoing description, the processing unit (selection unit) 23 randomly changes the environmental condition when the predetermined time has elapsed, although the control device 20 according to this embodiment is not limited to this. The control device 20 according to this embodiment may be configured to change the environmental condition when the predetermined condition is not satisfied instead of when the predetermined time has elapsed.

Figure 5:
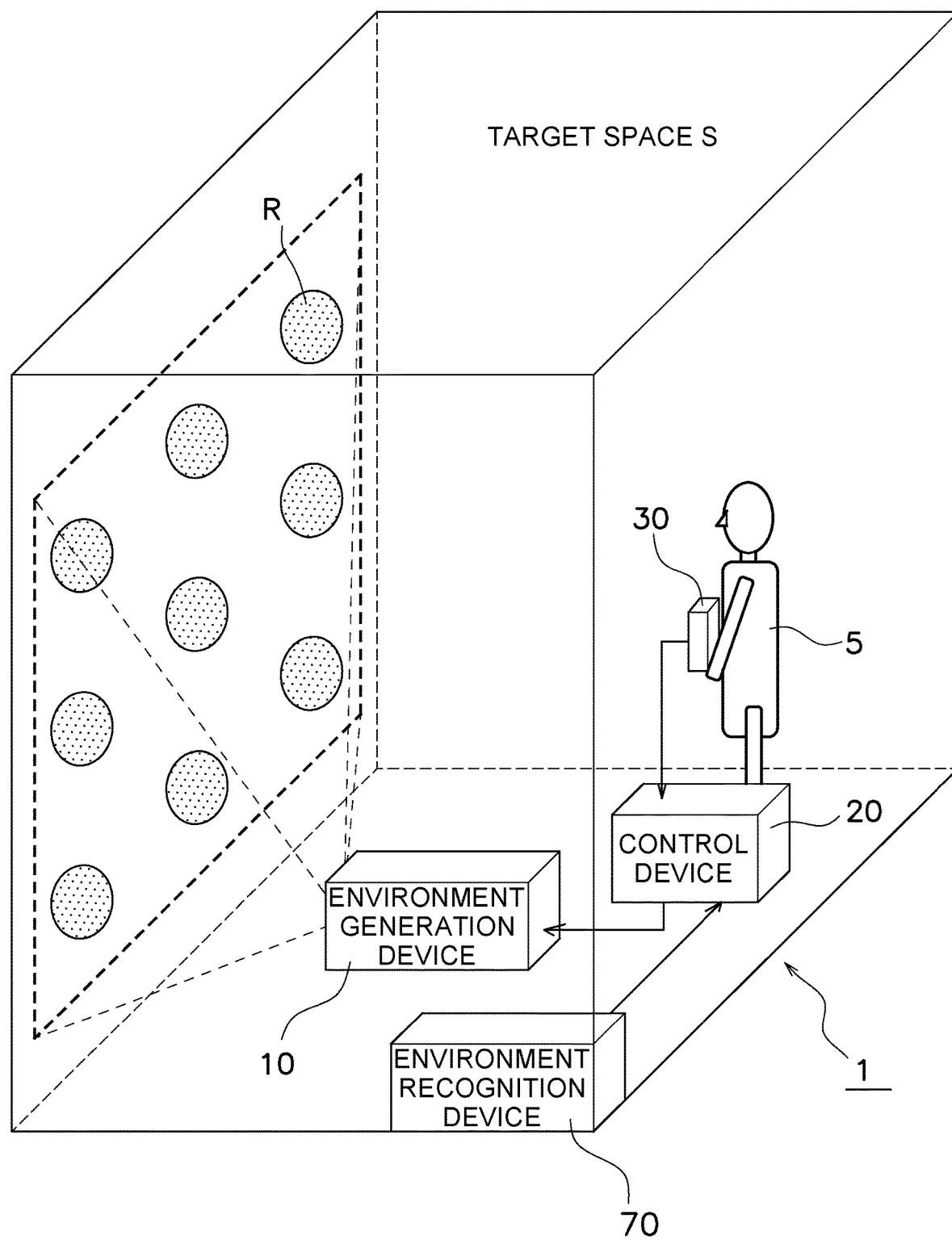
FIG. 5 is a schematic diagram for describing a configuration of an environment generation system 1 according to modification B.
Figure 6:
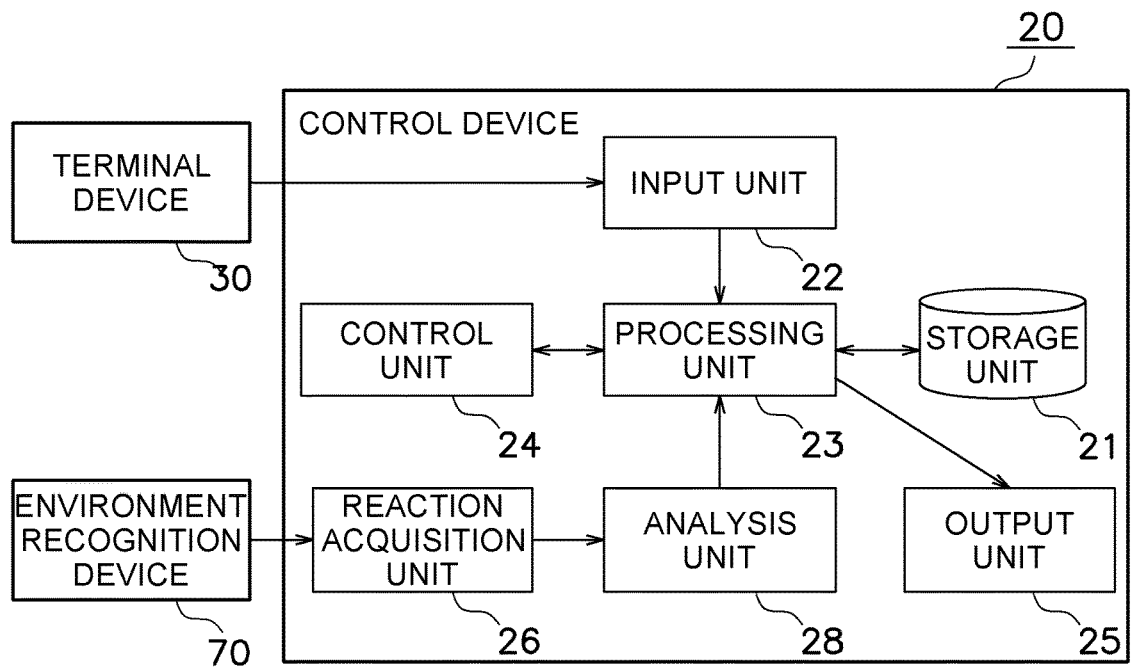
FIG. 6 is a schematic diagram for describing a configuration of a control device 20 according to modification B.

For example, as illustrated in FIG. 5, an environment recognition device 70 constituted by any one of a biological sensor, an imaging device, a recording device, a contact device, and a robot, any combination thereof, or the like is installed in the target space S. As illustrated in FIG. 6, a computer of the control device 20 further functions as a reaction acquisition unit 26, and the reaction acquisition unit 26 collects information on the user 5 present in the target space S, such as the physical condition, facial expression, behavior, and words and actions, from the environment recognition device 70 and acquires reaction information indicating a reaction of the user 5 present in the target space S. An analysis unit 28 performs analysis, such as analysis of the facial expression of the user, on the basis of the reaction information acquired by the reaction acquisition unit 26. The processing unit 23 changes the environmental condition in accordance with the analysis result obtained by the analysis unit 28.

Specifically, it is assumed that the feature of the cluster is the "enjoyable environment". It is also assumed that the analysis unit 28 performs analysis of the facial expression of the user 5 in the target space S. In the analysis result obtained by the analysis unit 28, if the number of images of the user 5 smiling exceeds a predetermined value, the processing unit 23 determines that the environment generated under the current environmental condition exerts an expected influence on the user 5 in the target space S, and performs control to maintain the current environmental condition. This configuration makes it possible to generate an environment according to the reaction of the user 5 present in the target space S.

Note that the environment recognition device 70 does not need to be fixed in the target space S and may be a device to be attached to the user 5, such as a fitness tracker.

(1-4-3) Modification C

Figure 7:
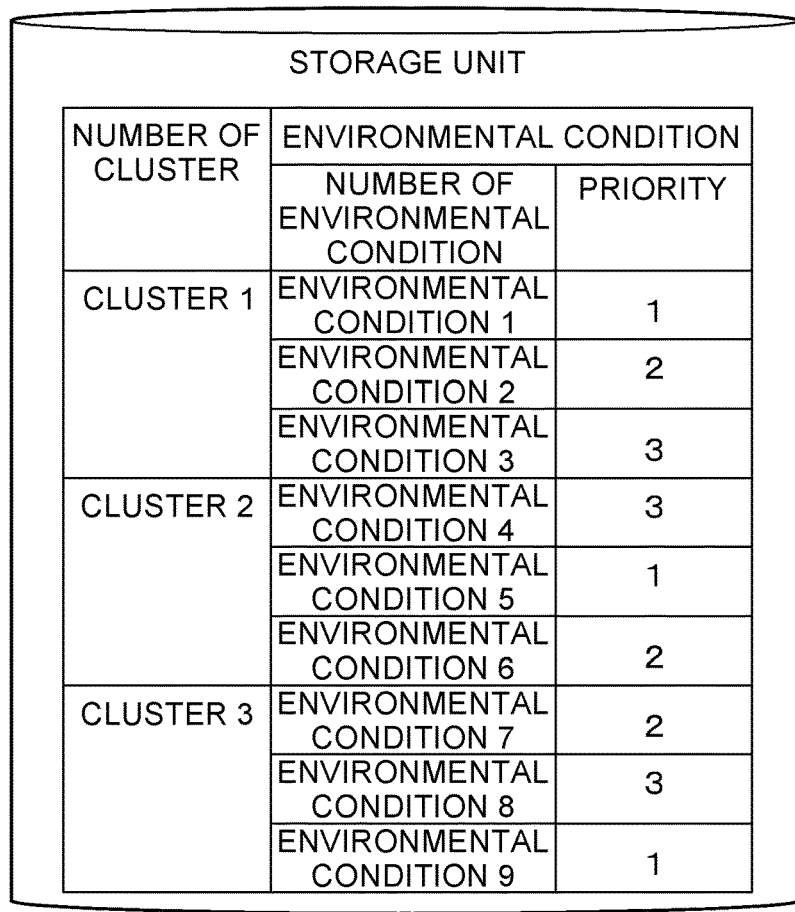
FIG. 7 is a schematic diagram for describing priority.

In the foregoing description, the processing unit (selection unit) 23 randomly changes the environmental condition to a next environmental condition when the predetermined time has elapsed, although the control device 20 according to this embodiment is not limited to this. For example, when the predetermined time has elapsed, the processing unit 23 of the control device 20 may change the environmental condition to a next environmental condition according to priority. As illustrated in FIG. 7, the priority is set for each cluster. The priority can be downloaded and updated whenever necessary.

The priority may be appropriately learned in accordance with the usage by the user 5. Alternatively, the priority may be appropriately learned on the basis of personal information of the user 5.

(1-4-4) Modification D

In the control device 20 according to this embodiment, the processing unit 23 may have a function of determining the priority of the environmental conditions described above. Specifically, the control device 20 further includes the reaction acquisition unit 26 described above. In addition, the processing unit (priority determination unit) 23 further has a function of determining the priority of environmental conditions belonging to each cluster on the basis of the reaction information acquired by the reaction acquisition unit 26 (information indicating the reactions of the user 5 present in the target space S).

Figure 8A:
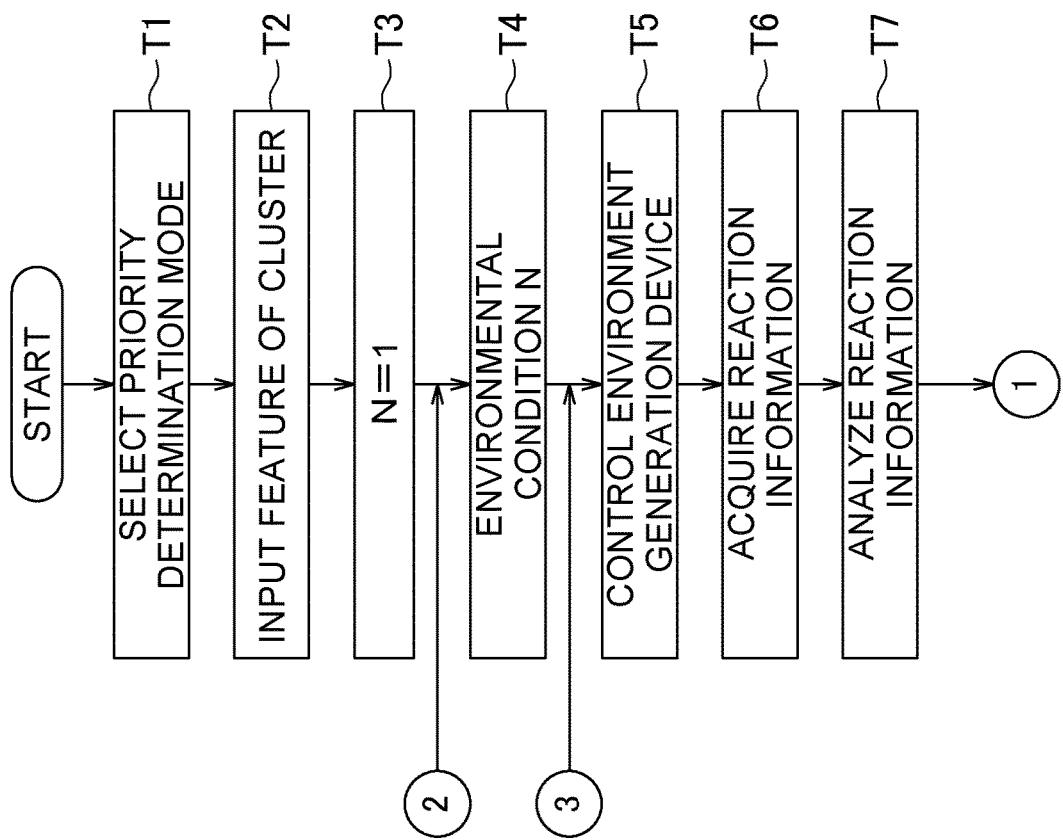
FIG. 8A is a flowchart for describing a process for determining the priority.
Figure 8B:
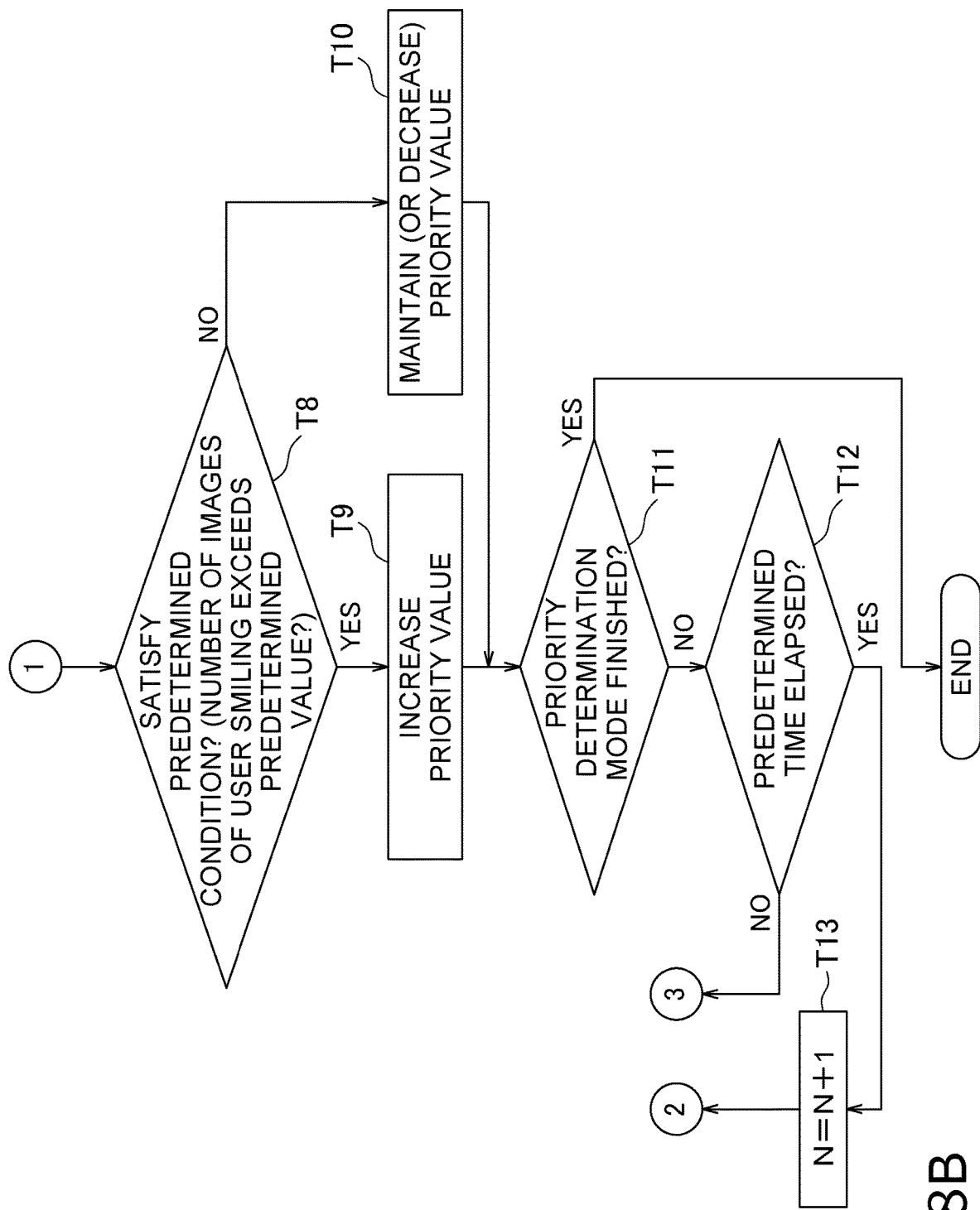
FIG. 8B is a flowchart for describing a process for determining the priority.

The determination of the priority will be described with reference to a flowchart illustrated in FIG. 8.

First, in the control device 20, a priority determination mode is selected (T1). Then, an input corresponding to a feature of a cluster is received (T2). It is assumed here that the "enjoyable environment" is input as the feature of the cluster. Then, the environment generation device 10 is controlled under a predetermined environmental condition N (T3, T4, and T5). In the priority setting mode, the reaction acquisition unit 26 acquires the facial expression or the like of the user 5 in the target space S as reaction information (T6). Then, the analysis unit 28 analyzes the reaction information (T7). Here, the analysis unit 28 performs analysis of the facial expression of the user 5. The processing unit 23 determines whether the predetermined condition is satisfied on the basis of the result of the analysis of the facial expression (T8). Here, as a result of the analysis of the facial expression, for example, if the amount of images of the user 5 smiling exceeds a predetermined value (T8—Yes), the processing unit 23 determines that the environment generated under the current environmental condition N exerts a specific influence on the user 5 in the target space S, and performs an update to increase the priority value (T9). On the other hand, on the basis of the result of the analysis of the facial expression, if the amount of images of the user 5 smiling does not exceed the predetermined value (T8—No), the processing unit 23 determines that the environment generated under the current environmental condition N does not exert a specific influence on the user 5 in the target space S, and does not change the priority value or performs an update to decrease the priority value (T10). Then, when a predetermined time has elapsed in the priority determination mode, the environment generation device 10 is controlled under the next environmental condition N+1 (T11—No, T12—Yes, T13, T4). Thereafter, the priority of the environmental condition is updated until the priority determination mode is canceled. Then, the priority converges according to the time length of the priority determination mode.

The determination or update of the priority may be performed by real-time processing or batch processing in which the reaction information acquired by the reaction acquisition unit 26 is periodically analyzed.

(1-4-5) Modification E

In the foregoing description, the processing unit (selection unit) 23 randomly changes the environmental condition when the predetermined time has elapsed, although the control device 20 according to this embodiment is not limited to this. For example, the environmental condition may be changed at any timing in accordance with an operation of the input unit 22 by the user 5.

Further, in the control device 20 according to this embodiment, the processing unit (priority determination unit) 23 may be configured to determine the priority of environmental conditions belonging to a cluster on the basis of the number of selections of the environmental conditions. Accordingly, the priority converges so as to select an environmental condition according to the preference of the user 5 in accordance with the duration of use of the control device 20 by the user 5. The determination or update of the priority may be performed by real-time processing or batch processing in which information acquired by the reaction acquisition unit 26 is periodically analyzed.

(1-4-6) Modification F

The features and environmental conditions of the clusters stored in the storage unit 21 described above can be updated whenever necessary. The environment generation device 10 can be controlled on the basis of the updated information.

Specifically, the information stored in the storage unit 21 can be downloaded and updated whenever necessary. For example, when a set of environmental conditions for a specific influence, such as an "environment with a party atmosphere", is newly defined, information on the environmental conditions can be downloaded into the storage unit 21 for use.

(1-4-7) Modification G

In the foregoing description, the environment generation device 10 and the control device 20 are separate devices. However, these devices may be incorporated into the same device as a single unit.

(2) Cluster Classification Device

The environmental conditions used in the environment generation system 1 described above can be classified using a cluster classification device. The following describes a first cluster classification device 50 that sets a feature of a cluster later, and a second cluster classification device 60 in which a feature of a cluster is set in advance.

(2-1) First Cluster Classification Device (2-1-1) Configuration of First Cluster Classification Device First, the first cluster classification device 50 will be described. As a premise, it is assumed that the environment generation device 10 is controlled by a control device 20X to generate a specific environment in the target space S. Note that the control device 20X has functions similar to those of the control device 20 described above and that an input unit 22X further has a function of inputting a predetermined environmental condition. For convenience of description, the suffix X is used for elements of the control device 20X different from those of the control device 20.

Figure 9:
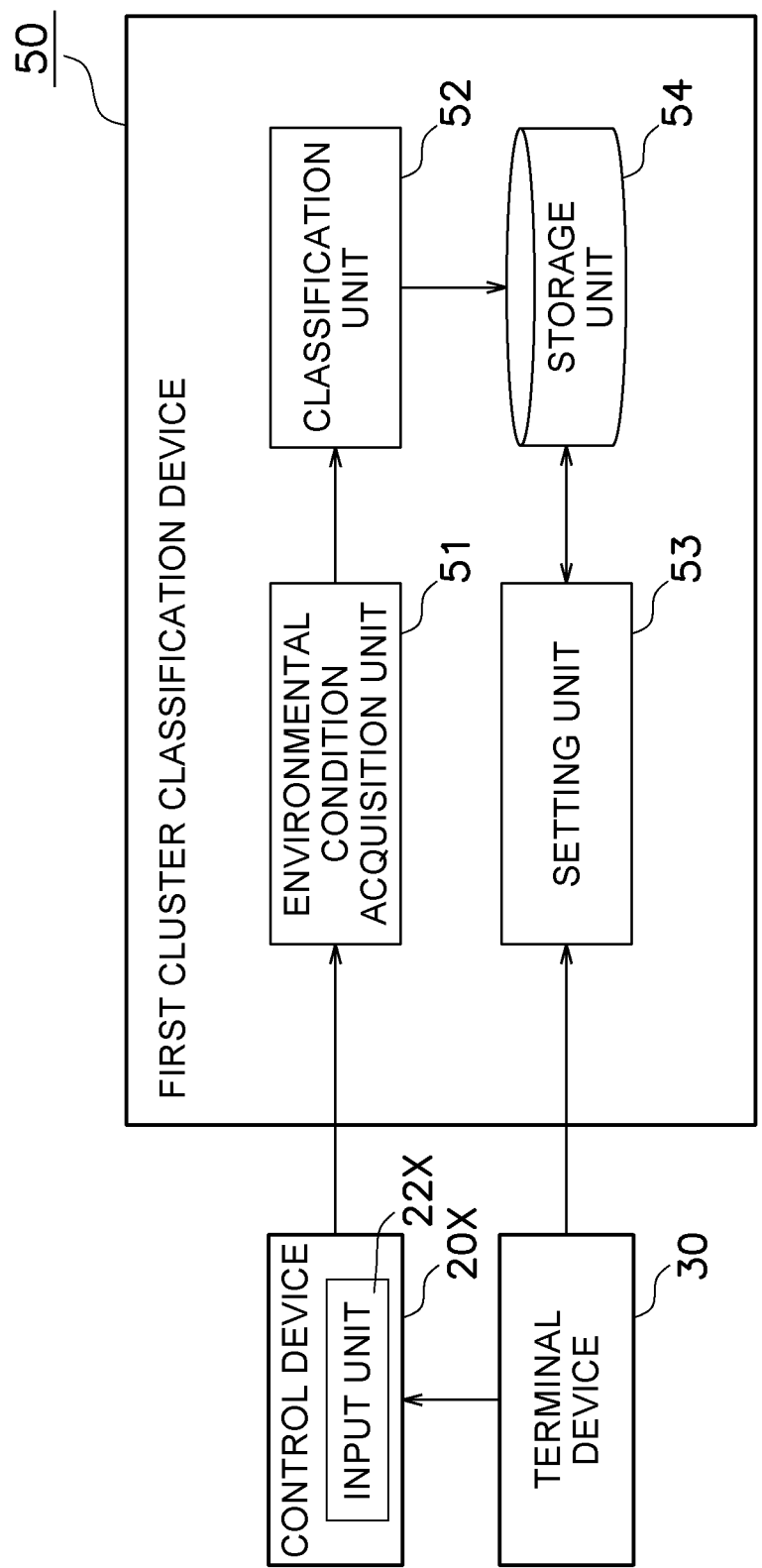
FIG. 9 is a schematic diagram for describing a configuration of a first cluster classification device 50.

FIG. 9 is a schematic diagram for describing a configuration of the first cluster classification device 50. The first cluster classification device 50 can be implemented by any computer and includes an environmental condition acquisition unit 51, a classification unit 52, a setting unit 53, and a storage unit 54. The functions described above are implemented by loading a program stored in a storage device (such as a ROM or a RAM) into a CPU, a GPU, or the like of the computer. However, this is not limiting, and the first cluster classification device 50 may be implemented as hardware by using an LSI (Large Scale Integration), an ASIC (Application Specific Integrated Circuit), an FPGA (Field-Programmable Gate Array), or the like.

Note that the first cluster classification device 50 and the control device 20X may not be separate, independent devices and may be incorporated into the same device as a single unit.

The environmental condition acquisition unit 51 acquires an environmental condition for generating a specific environment in the target space S. Here, in response to the operation of the terminal device 30, an environmental condition is appropriately input via the input unit 22X of the control device 20X, under which the environment generation device 10 is controlled. Accordingly, the environmental condition acquisition unit 51 acquires the environmental condition input via the input unit 22X of the control device 20X.

Figure 10:
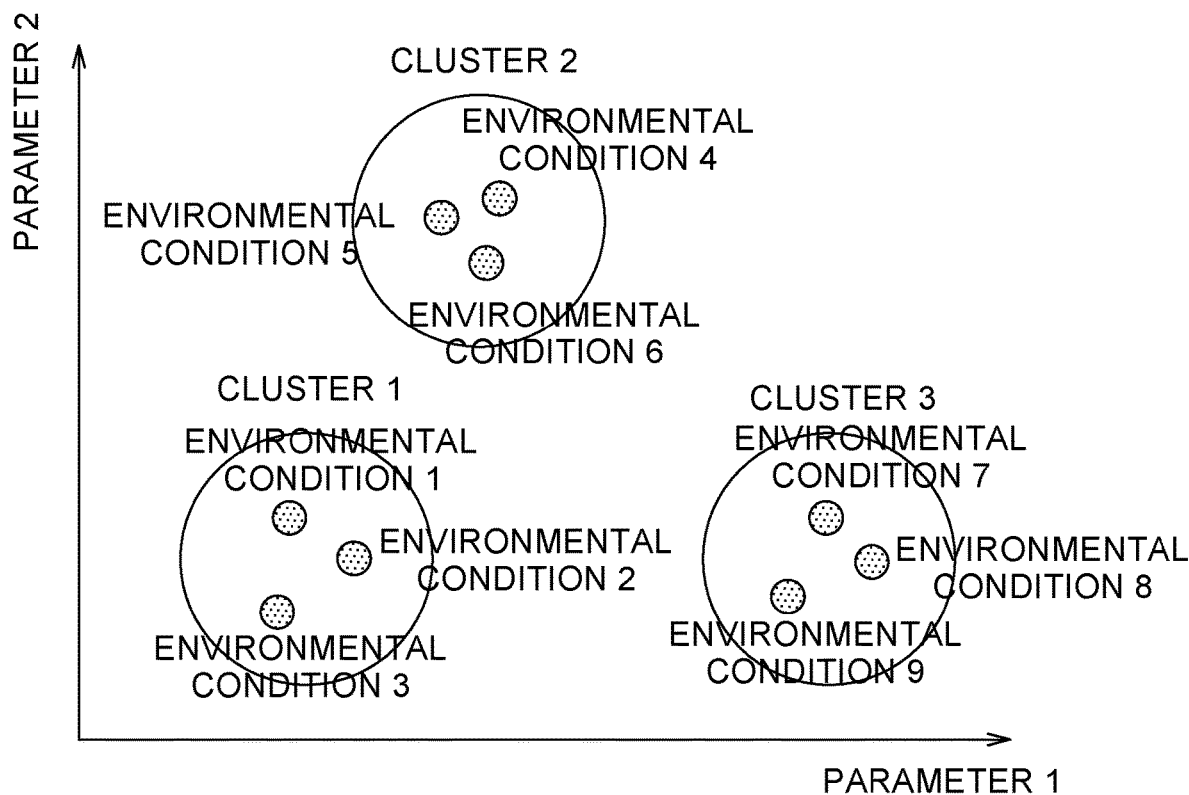
FIG. 10 is a schematic diagram for describing a concept of clusters.

The classification unit 52 clusters environmental conditions acquired by the environmental condition acquisition unit 51 on the basis of the features of the environmental conditions to generate a plurality of clusters. Each cluster includes a range of environmental conditions or a set of a plurality of environmental conditions. For clustering, an optimum clustering method (for example, the K-means method) can be appropriately adopted. Specifically, the classification unit 52 weights each of a plurality of parameters (here, n physical quantities) of the environmental conditions and sets, as the same cluster, environmental conditions at distances within a predetermined range in an n-dimensional space generated by the weighted parameters. For example, for convenience of description, assuming two parameters for the environmental conditions, as illustrated in FIG. 10, the environmental conditions 1 to 9 are plotted in a two-dimensional space. In the example illustrated in FIG. 10, the classification unit 52 classifies the environmental conditions 1 to 9 so that the environmental conditions 1 to 9 belong to a plurality of clusters 1 to 3.

The setting unit 53 receives input of information via any terminal device 30 or the like and sets the features of the clusters classified by the classification unit 52 on the basis of the received information. Here, the features of the clusters can be freely defined by a setting operator. For example, when the clusters 1, 2, and 3 are present, the setting operator can set the features of the clusters by using the function of the setting unit 53 such that the feature "enjoyable environment" is set for the cluster 1, the feature "environment that enhances concentration" is set for the cluster 2, and the feature "environment that encourages openness" is set for the cluster 3. Alternatively, features of clusters may be set using expressions using onomatopoeic words or mimetic words related to tactile sensations, such as a smooth feel (slippery), a rough feel (coarse), and a soft feel (fluffy). Here, the features of the clusters are set by attaching language labels as tags. In the setting of the feature of a cluster, only one tag may be attached. However, it is possible to attach a plurality of tags to one cluster. For example, the feature of one cluster may be set by the tag "enjoyable" and the tag "open".

The storage unit 54 stores each cluster and the feature of the cluster in association with each other. Writing the information stored in the storage unit 54 to any storage device makes it possible to form the storage unit 21 of the control device 20 in the environment generation system 1 described above.

(2-1-2) Operation of First Cluster Classification Device

Figure 11:
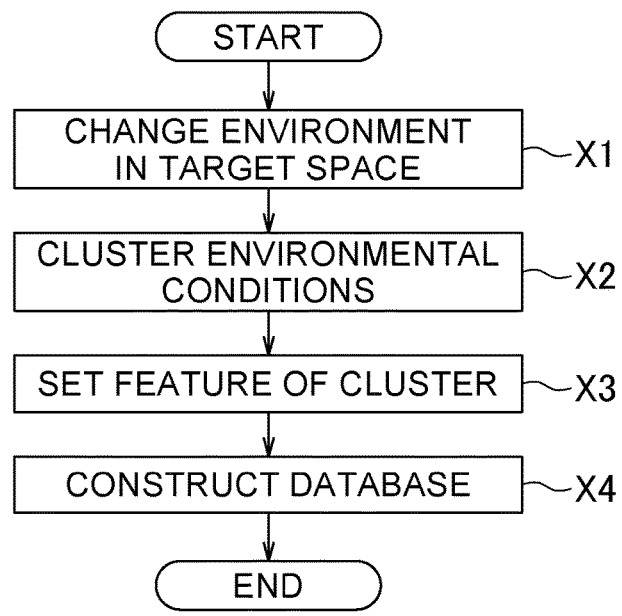
FIG. 11 is a flowchart for describing an operation of the first cluster classification device 50.

FIG. 11 is a flowchart for describing the operation of the first cluster classification device 50.

First, the environment generation device 10 and the control device 20X are used by a plurality of users for a predetermined period without constraint. Each user freely changes the environmental condition using the terminal device 30 and changes the environment in the target space S using the environment generation device 10 and the control device 20X (X1). The environmental condition may be freely changed by the tactile sensation selection device 80 or the operation device 85 as an application of the tactile sensation selection device 80 described below.

Then, an analysis is made on the environmental conditions used in a period during which the environment generation device 10 and the control device 20X are used. Specifically, a plurality of environmental conditions are clustered by the classification unit 52, and one or more clusters are generated (X2).

Then, the setting operator inputs information indicating the features of the clusters using the terminal device 30 or the like. The features of the clusters are defined by the setting operator. In response to this, the setting unit 53 sets the features of the clusters (X3).

As a result, a database in which the features of the clusters are associated with the environmental conditions is constructed and stored in the storage unit 54 (X4).

As described above, the first cluster classification device 50 includes the environmental condition acquisition unit 51, the classification unit 52, the setting unit 53, and the storage unit 54. The environmental condition acquisition unit 51 acquires an environmental condition for generating a specific environment in the target space S. The classification unit 52 classifies the environmental conditions into a plurality of clusters. The setting unit 53 sets the features of the clusters. The storage unit 54 stores the features of the clusters and the environmental conditions in association with each other. In short, the first cluster classification device 50 classifies the environmental conditions into a plurality of clusters and receives setting of the features of the classified clusters. Since the first cluster classification device 50 has the configuration described above, the setting operator can set the features of the clusters later. On the basis of this, a database in which the features of the clusters are associated with the environmental conditions can be constructed.

Additionally, the first cluster classification device 50 classifies an environmental condition into a predetermined cluster to perform model evaluation, and performs model generation when an environmental condition is classified into a new cluster. In other words, when an environmental condition that is difficult to be classified into any existing cluster is generated by the user, the classification unit 52 of the first cluster classification device 50 adds a new cluster.

(2-1-3) Modifications

Figure 12:
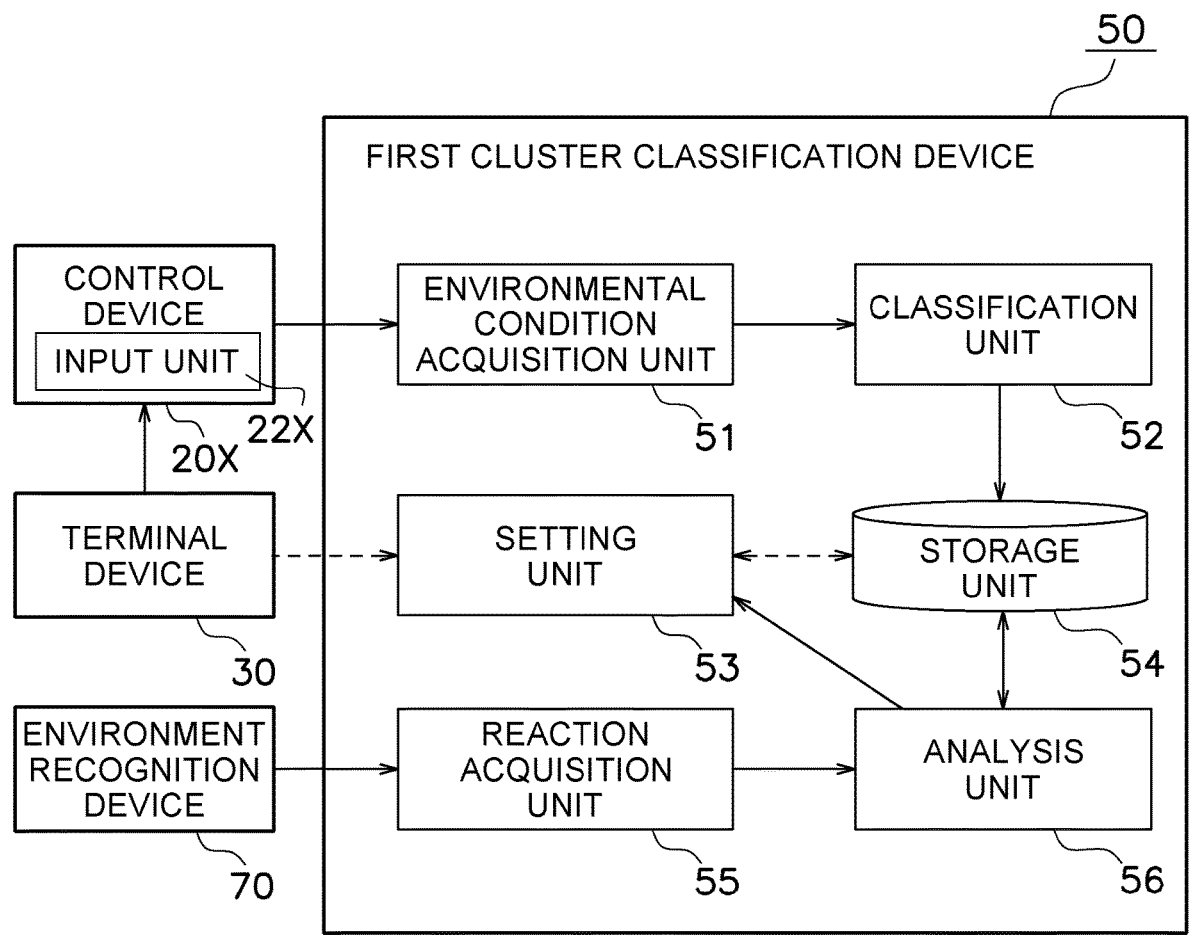
FIG. 12 is a schematic diagram for describing a configuration of a modification of the first cluster classification device 50.

In step X3, instead of the features of the clusters being defined by the setting operator, the features of the clusters can be defined on the basis of the reactions of the user 5 present in the target space S. Specifically, the environment recognition device 70 constituted by any one of a biological sensor, an imaging device, a recording device, a contact device, and a robot, any combination thereof, or the like is installed in the target space S. As illustrated in FIG. 12, a computer of the first cluster classification device 50 further functions as a reaction acquisition unit 55, and the reaction acquisition unit 55 acquires reaction information indicating a reaction of the user 5 present in the target space S. Further, the computer of the first cluster classification device 50 further functions as an analysis unit 56, and the analysis unit 56 performs analysis of the facial expression or the like of the user 5 on the basis of the reaction information acquired by the reaction acquisition unit 55. On the basis of the analysis result obtained by the analysis unit 56, for example, if the amount of images of the user 5 smiling exceeds a predetermined value, the setting unit 53 also functioning as a portion of a processing unit characterizes the cluster corresponding to the environmental condition at that time as the "enjoyable environment". Then, the setting unit 53 stores the feature of the cluster and the environmental condition in the storage unit 54 in association with each other. Note that the environment recognition device 70 does not need to be fixed in the target space S and may be a device to be attached to the user 5, such as a fitness tracker.

Like the control device 20 illustrated in FIG. 6, the control device 20X may be provided with the reaction acquisition unit 26, and changes the environmental condition or changes the priority of the environmental condition in accordance with the analysis result based on the reaction information acquired by the reaction acquisition unit 26. On the other hand, the result of analysis of the reaction information acquired from the reaction acquisition unit 55 of the first cluster classification device 50 described above is used for characterizing the cluster.

Alternatively, in step X3 described above, when the setting operator defines a feature of a cluster, an input of text by the user 5 may be received. In this case, the setting unit 53 analyzes the text in accordance with a predetermined algorithm and identifies an impression received by the user 5 from the text. Then, the setting unit 53 sets the identified impression as the feature of the cluster.

Alternatively, in step X3 described above, when the setting operator defines a feature of a cluster, the feature of the cluster may be defined by reflecting the attribute of the target space S. For example, if the use of the target space S can be recognized in advance as a conference room, a restaurant, a hospice, or the like, information on the use is reflected in a feature of a cluster. In short, an "environment in an enjoyable conference room" or the like can be set as a feature of a cluster. Alternatively, features of clusters may be set using expressions by onomatopoeic words or mimetic words related to tactile sensations, such as a smooth feel (slippery), a rough feel (coarse), and a soft feel (fluffy).

(2-2) Second Cluster Classification Device (2-2-1) Operation of Second Cluster Classification Device Next, the second cluster classification device 60 will be described. As a premise, it is assumed that the environment generation device 10 is controlled by a control device 20Y to generate a specific environment in the target space S. Note that the control device 20Y has functions similar to those of the control device 20 described above and is different from the control device 20 in that an input unit 22Y is capable of inputting a predetermined environmental condition. For convenience of description, the suffix Y is used for elements of the control device 20Y different from those of the control device 20.

Figure 13:
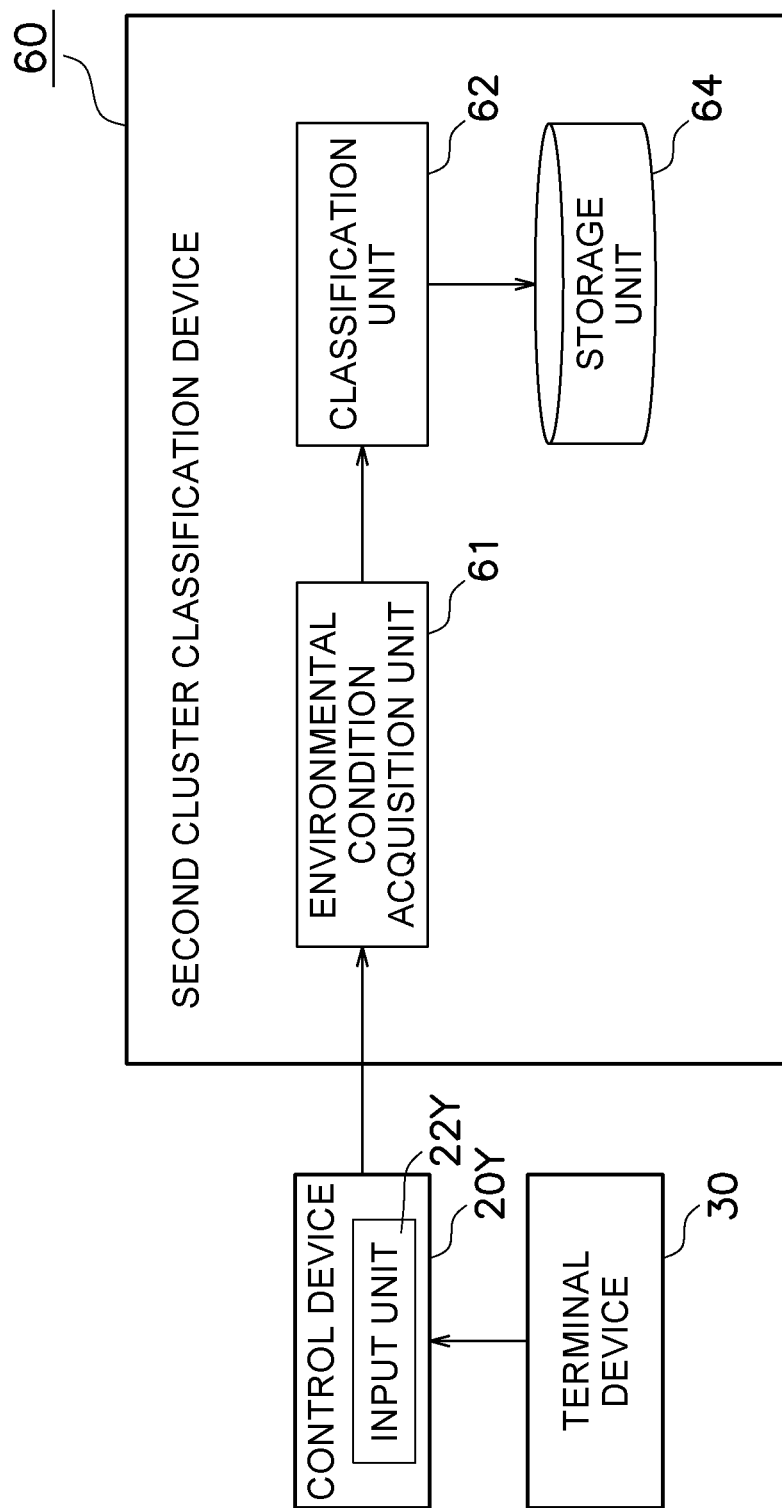
FIG. 13 is a schematic diagram for describing a configuration of a second cluster classification device 60.

FIG. 13 is a schematic diagram for describing a configuration of the second cluster classification device 60. The second cluster classification device 60 can be implemented by any computer and includes an environmental condition acquisition unit 61, a classification unit 62, and a storage unit 64. The functions described above are implemented by loading a program stored in a storage device (such as a ROM or a RAM) into a CPU, a GPU, or the like of the computer. However, this is not limiting, and the second cluster classification device 60 may be implemented as hardware by using an LSI (Large Scale Integration), an ASIC (Application Specific Integrated Circuit), an FPGA (Field-Programmable Gate Array), or the like.

Note that the second cluster classification device 60 and the control device 20Y may not be separate, independent devices and may be incorporated into the same device as a single unit.

The environmental condition acquisition unit 61 acquires an environmental condition for generating, in the target space S, a defined environment having a concept that is defined in advance. Examples of the "defined environment" include an "enjoyable environment", an "environment that enhances concentration", an "environment that encourages openness", onomatopoeic words or mimetic words related to tactile sensations such as a smooth feel (slippery), a rough feel (coarse), and a soft feel (fluffy). The environmental condition acquisition unit 61 acquires an environmental condition from the input unit 22Y of the control device 20 described above. Here, the user is presented with the concept of the defined environment and is instructed to input an environmental condition to create the defined environment. In response to this instruction, the user operates the terminal device 30, inputs the environmental condition via the input unit 22Y to control the environment generation device 10, in an attempt to generate the defined environment in the target space S. At this time, the environmental condition acquisition unit 61 appropriately acquires the environmental condition input by the operation of the terminal device 30 described above.

The classification unit 62 classifies the environmental condition into a predetermined cluster so as to correspond to the concept of the defined environment. For example, when an instruction is given to a plurality of users to generate an "enjoyable environment" as the defined environment, a set of environmental conditions input by the respective users via the input unit 22Y or a region including the environmental conditions is classified into the same cluster. The classification unit 62 eliminates abnormal values in accordance with a predetermined algorithm.

The storage unit 64 stores the concept of the defined environment and the environmental conditions in association with each other. Here, the concept of the defined environment is regarded as a feature of a cluster. Accordingly, the storage unit 64 stores a feature of a cluster and environmental conditions in association with each other. Writing the information stored in the storage unit 64 to any storage device makes it possible to form the storage unit 21 of the control device 20 in the environment generation system 1 described above.

(2-2-2) Operation of Second Cluster Classification Device

Figure 14:
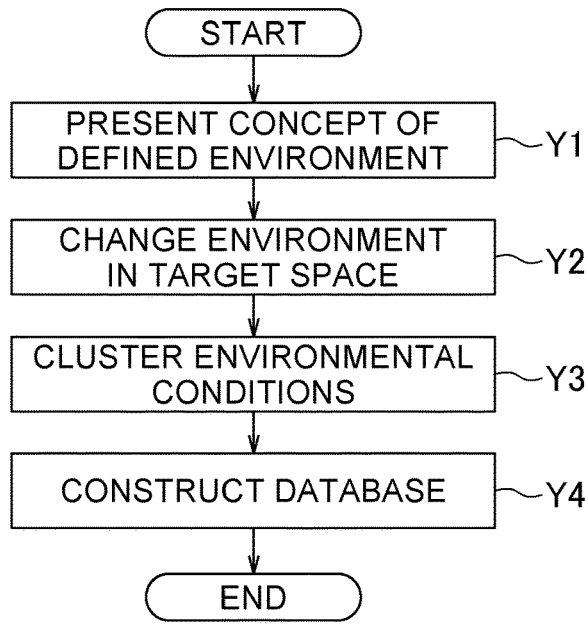
FIG. 14 is a flowchart for describing the operation of the second cluster classification device 60.

FIG. 14 is a flowchart for describing the operation of the second cluster classification device 60.

First, a plurality of users are presented with a concept of a defined environment and are instructed to input an environmental condition to create the environment (Y1). Thereafter, the environment generation device 10 and the control device 20Y are used by each user for a predetermined period. Here, each user changes the environmental condition using the terminal device 30 via the control device 20Y so that the changed environmental condition matches the concept of the defined environment, in an attempt to generate the defined environment in the target space S using the environment generation device 10 (Y2).

Then, an analysis is made on the environmental condition used in a period during which the environment generation device 10 is used. Specifically, the classification unit 62 eliminates abnormal values in accordance with a predetermined algorithm, and clusters a plurality of environmental conditions set by the plurality of users for each concept of defined environment (Y3).

Then, the classification unit 62 determines the defined environment to be a feature of a cluster and associates the feature of the cluster with the environmental condition. As a result, a database in which the feature of the cluster is associated with the environmental condition is constructed and stored in the storage unit 64 (Y4).

As described above, the second cluster classification device 60 includes the environmental condition acquisition unit 61, the classification unit 62, and the storage unit 64. The environmental condition acquisition unit 61 acquires an environmental condition for generating, in the target space S, a defined environment having a concept that is defined in advance. The classification unit 62 classifies the environmental condition into a predetermined cluster in accordance with the concept of the defined environment. The storage unit 64 stores the concept of the defined environment and the environmental condition in association with each other. In short, the second cluster classification device 60 clusters environmental conditions in association with a defined environment. Since the second cluster classification device 60 has the configuration described above, the second cluster classification device 60 can collect and cluster a plurality of environmental conditions in a situation where the features of clusters are defined in advance. On the basis of this, a database in which the features of the clusters are associated with the environmental conditions can be constructed.

(2-2-3) Modifications

In step Y3 described above, combining the second cluster classification device 60 with the first cluster classification device 50 makes it possible to set a definition in which a feature of a predetermined dimension is further added to the defined environment. Specifically, a plurality of environmental conditions belonging to a concept of the defined environment, which are clustered by the classification unit 62 of the second cluster classification device 60, are classified into a plurality of new clusters by the classification unit 52 of the first cluster classification device 50. Then, the setting unit 53 of the first cluster classification device 50 sets, for the clusters, features of new clusters. As a result, for example, if the defined environment is an "enjoyable environment", a plurality of environmental conditions classified into the "enjoyable environment" can be classified into new clusters such as an "environment with an increased sense of exaltation" and an "environment with an increased feeling of happiness".

In other words, combining the first cluster classification device 50 with the second cluster classification device 60 makes it possible to collect, after presenting a vaguely defined environment (such as an "enjoyable environment"), environment information corresponding to more finely defined environments (such as an "environment with an increased sense of exaltation" and an "environment with an increased feeling of happiness"). On the basis of this, a database in which the features of the clusters are associated with the environmental conditions can be constructed.

Figure 15:
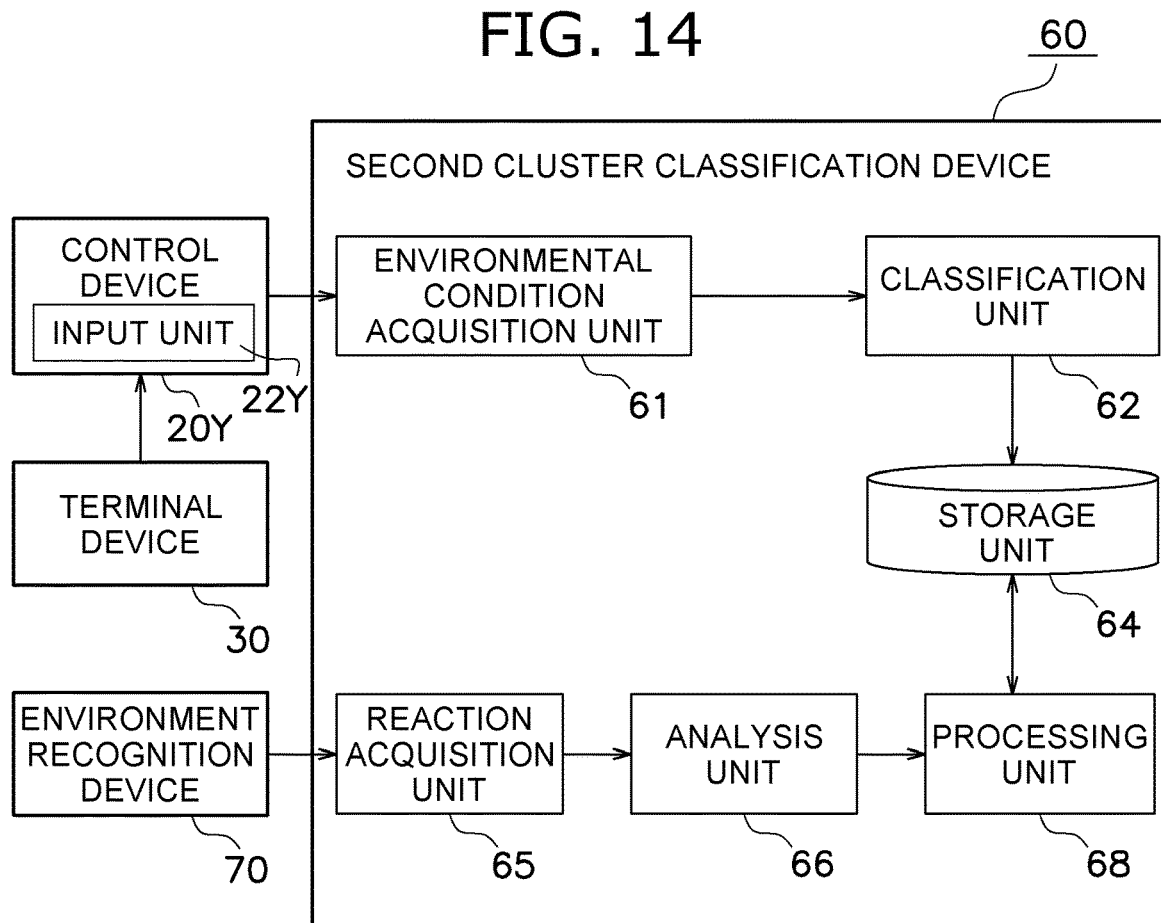
FIG. 15 is a schematic diagram for describing a configuration of a modification of the second cluster classification device 60.

In step Y3 described above, furthermore, a feature of a cluster can be defined by reflecting not only a concept of the defined environment but also a reaction of the user 5 present in the target space S. Specifically, the environment recognition device 70 constituted by any one of a biological sensor, an imaging device, a recording device, a contact device, and a robot, any combination thereof, or the like is installed in the target space S. As illustrated in FIG. 15, a computer of the second cluster classification device 60 also functions as a reaction acquisition unit 65, and the reaction acquisition unit 65 acquires reaction information indicating a reaction of the user 5 present in the target space S. Further, the computer of the second cluster classification device 60 also functions as an analysis unit 66, and the analysis unit 66 performs analysis of the facial expression or the like of the user 5 on the basis of the reaction information acquired by the reaction acquisition unit 65. On the basis of the analysis result obtained by the analysis unit 66, when the concept of the defined environment is an "enjoyable environment" and the amount of images of the user 5 smiling exceeds a predetermined value, a processing unit 68 characterizes a cluster corresponding to the environmental condition at that time as the "environment with an increased feeling of happiness", which is obtained by finely classifying the "enjoyable environment". Then, the processing unit 68 stores the feature of the cluster and the environmental condition in the storage unit 64 in association with each other. Note that the environment recognition device 70 does not need to be fixed in the target space S and may be a device to be attached to the user 5, such as a fitness tracker.

Like the control device 20 illustrated in FIG. 6, the control device 20Y may be provided with the reaction acquisition unit 26, and changes the environmental condition or changes the priority of the environmental condition in accordance with the analysis result based on the reaction information acquired by the reaction acquisition unit 26. On the other hand, the result of analysis of the reaction information acquired from the reaction acquisition unit 65 of the second cluster classification device 60 described above is used for characterizing (such as re-classifying) the cluster.

(2-2-4) Experimental Example 1

The following describes Experimental Example 1 for the extraction of feature values of clusters. In the following description, the "atmosphere" is an impression or sensation that a person subjectively perceives to the environment.

Method in Experimental Example 1

Subjects: 52 participants from 18 to 42 years old participated in the experiment. Among them, two participants failed to save the created atmospheres. Finally, 50 participants (30 males, the mean age was 22.82 years old, and SD was 6.16 years old) were the target of analysis.

Procedure: The participants were instructed: "You are now going to be asked to create three types of images that will change the atmosphere of the room using a projection mapping builder (an example of an input unit). Please assume that the images you have created will be projected in a projection mapping room with walls on four sides. Please create three different atmospheres: an atmosphere of feeling energized; an atmosphere of feeling embraced; and an atmosphere of tense feeling when the images created using the projection mapping builder are projected in the projection mapping room with walls on four sides".

After that, the participants created three atmospheres, including the "atmosphere of feeling energized", the "atmosphere of feeling embraced", and the "atmosphere of tense feeling", on a computer screen (23 inches). The participants were free to manipulate 12 elements on the screen (the randomness of circles projected on the wall, the number of circles, the size of the circles, the moving direction (X) of the circles, the moving direction (Y) of the circles, the moving speed of the circles, the color (R) of the circles, the color (G) of the circles, the color (B) of the circles, the color (R) of the wall, the color (G) of the wall, and the color (B) of the wall). The experiment was terminated at the point in time when the creation of the three atmospheres was completed.

Results of Experimental Example 1

First, one-factor analysis of variance having correspondences was performed on the three atmospheres created by the participants to examine whether there was a difference in each of the 12 elements. Note that the p values were subjected to the Bonferroni correction. The results are shown in Table 1.

TABLE 1

| Element | F Value | p Value | Multiple Comparison |
|---|---|---|---|
| Randomness of Circles | — | p = .006 | Energized = tense < Embraced |

TABLE 1-continued

| Element | F Value | p Value | Multiple Comparison |
|---|---|---|---|
| Number of Circles | 9.52 | p = .001 | Energized = Embraced < Tense |
| Size of Circles | 4.90 | p = .01 | Tense < Energized |
| Moving Direction (X) of Circles | 1.84 | p = 1.43, ns | — |
| Moving Direction (Y) of Circles | 28.42 | p = .001 | Embraced = Tense < Energized |
| Moving Speed of Circles | 39.93 | p = .001 | Embraced < Energized < Tense |
| Color (R) of Circles | 9.45 | p = .001 | Tense = Embraced < Energized |
| Color (G) of Circles | 21.38 | p = .001 | Tense < Energized = Embraced |
| Color (B) of Circles | 6.64 | p = .02 | Tense < Embraced |
| Color (R) of Wall | 6.29 | p = .03 | Embraced = Tense < Energized |
| Color (G) of Wall | 17.19 | p = .001 | Embraced = Tense < Energized |
| Color (B) of Wall | 2.66 | p = .83, ns | — |

Table 1 indicates that for the "atmosphere of feeling energized" among the features of the three atmospheres, the circles projected on the wall move upward more than the other atmospheres and both the color of the circles and the color of the background are higher in red (R) than the other atmospheres. It is also indicated that for the "atmosphere of feeling embraced", the circles projected on the wall are arranged more randomly and the moving speed of the circles is slower than the other atmospheres. It is also indicated that for the "atmosphere of tense feeling", the number of circles projected on the wall is larger, the size of the circles is smaller, and the moving speed of the circles is faster than the other atmospheres. As described above, collecting and analyzing data of the atmospheres created by the 50 participants make it possible to present the features of the elements for each atmosphere in detail.

Extraction of Feature Values of Three Atmospheres)

Next, principal component analysis was performed on the 12 elements to extract the feature values of the three atmospheres from these pieces of data. The equation is as follows.

(Math. 1)

Y is referred to as a 12-dimensional element and is projected onto a low-dimensional feature vector.

Projection f $$f: y \rightarrow x = (W_{PCA}) y$$

As a result, as shown in Table 2, four components having eigenvalues greater than or equal to 1.0 were extracted.

TABLE 2

| Element | Component | | | |
|---|---|---|---|---|
|  | 1 | 2 | 3 | 4 |
| Number of Circles | −0.690 | −0.103 | −0.295 | 0.137 |
| Size of Circles | 0.661 | −0.158 | 0.166 | −0.240 |
| Color (G) of Wall | 0.621 | −0.572 | −0.178 | 0.172 |
| Speed of Circles | −0.419 | −0.074 | 0.408 | 0.112 |
| Color (G) of Circles | 0.543 | 0.586 | −0.179 | 0.075 |
| Random Display of Circles | 0.196 | 0.565 | −0.171 | 0.350 |
| Color (R) of Wall | 0.390 | −0.540 | 0.243 | 0.312 |
| Color (B) of Wall | 0.416 | −0.385 | −0.586 | −0.060 |
| Color (R) of Circles | 0.404 | 0.411 | 0.558 | −0.002 |
| Color (B) of Circles | 0.282 | 0.417 | −0.497 | −0.174 |

TABLE 2-continued

| | Component | | | |
|---|---|---|---|---|
| Element | 1 | 2 | 3 | 4 |
| Direction (X) of Circles | 0.202 | −0.033 | 0.313 | −0.686 |
| Direction (Y) of Circles | 0.333 | 0.069 | 0.298 | 0.528 |

The contribution of the first component was 21.06% (eigenvalue=2.53), the contribution of the second component was 15.17% (eigenvalue=1.82), the contribution of the third component was 12.68% (eigenvalue=1.52), and the contribution of the fourth component was 9.40% (eigenvalue=1.13). The cumulative contribution was 58.31%.

Then, the feature space extracted by principal component analysis was subjected to cluster analysis using the K-means method. As a result, four clusters were obtained. Then, for each of the four clusters, calculation was made to find a percentage of labels named "atmosphere of feeling energized", "atmosphere of feeling embraced", and "atmosphere of tense feeling" by the participants. An atmosphere label having a high percentage (56.0% or higher) was assigned as a cluster name. As a result, the cluster 1 was assigned the cluster name "atmosphere of tense feeling". The cluster 3 was assigned the cluster name "atmosphere of feeling energized", and the cluster 4 was assigned the cluster name "atmosphere of feeling embraced". The cluster 2 was given no label because the proportions of the three atmospheres were not biased. As described above, it was possible to extract and categorize the respective feature values of the three atmospheres. As a next process, a system was implemented that automatically generates the respective atmospheres on the basis of the obtained feature values.

(2-2-5) Automatic Generation of Parameters for Each Cluster

Next, a process of automatically generating parameters from each cluster will be described. First, for any one of the four clusters, the respective parameters of the 12 elements were generated on the basis of the average values and the SD. The parameters were generated using random numbers. Then, the generated parameter of each of the 12 elements was normalized, and an inner product of the eigenvector was taken to project the normalized parameter onto the feature space subjected to clustering. However, it is not guaranteed that the generated parameter belongs to a specific cluster in the space subjected to clustering processing, and thus a determination was made as to whether the parameter was included in the feature space. The criterion for determination was whether the parameter was within ±1 SD in the feature space. When the projected parameter belongs to a specific cluster in the four-dimensional space (four components derived from principal component analysis), the generated parameter was considered to be included in the cluster and was adopted. Otherwise, the parameter was rejected, and a parameter was generated again through the same procedure.

An evaluation experiment was performed for the parameters of each cluster, which were generated by the method described above, to determine what impression the participants had (Experimental Example 2 below).

(2-2-6) Experimental Example 2

The following describes an evaluation experiment of the automatically generated clusters.

(Experiment Method)

Subjects: 14 participants from 18 to 25 years old participated in the experiment (eight males, the mean age was 21.21 years old, and SD was 2.04 years old). None of the participants participated in the experiment in Experimental Example 1.

Procedure: The participants were instructed: "You are now going to be asked to enter a room with walls on four sides and projection mapping projected and to answer questions about the atmosphere of the room. Please keep your eyes on the room until the sound signal is given. When you hear the sound, please answer the questions". After that, the participants moved to the laboratory. In the experiment, each participant was randomly presented with projection mapping images for eight automatically generated clusters (two parameters each generated from four clusters were presented). In addition, the participants were seated in the center of the laboratory and watched the projection mapping images for 30 seconds. After 30 seconds, the sound signal was given, and then, the participants answered the questions.

Questions:

Semantic differential (SD) method questions: The participants were instructed: "Please select the number that best describes your impression of this room". Then, the participants were asked for a total of seven items, namely, "uncomfortable vs. comfortable", "bored vs. beautiful", "tired vs. refreshed", "quiet vs. noisy", "stressful vs. relaxed", "blurry vs. clear", and "open communication vs. controlled", using a seven-point scale.

Questions for onomatopoeic (here, mimetic words or onomatopoeic words related to tactile sensations) pairs: The participants were instructed: "Please select one of the two words (onomatopoeia) in each of the following pairs that best describes your impression of this room". Then, the participants were asked for a total of ten items, namely, "Pasa-pasa vs. Puru-puru" (dry vs. jiggly), "Sube-sube vs. Kasa-kasa" (smooth vs. dry), "Tsuru-tsuru vs. Shaka-shaka" (slippery vs. rattled), "Mosa-mosa vs. Poko-poko" (mossy vs. lumpy), "Zara-zara vs. Fuka-fuka" (coarse vs. fluffy), "Suru-suru vs. shori-shori" (smooth vs. grainy), "Howa-howa vs. funi-funi" (fluffy vs. limp), "Chiku-chiku vs. Gasa-gasa" (prickling vs. leathery), "Moko-moko vs. Tsubu-tsubu" (fluffy vs. grainy), and "fuwa-fuwa vs. Sara-sara" (fluffy vs. smooth), using a two-point scale.

Body map: The participants were instructed: "When you are in this room, what part of your body do you think is more or less active? Please touch the appropriate part (the red heart indicates the heart)". Then, the number of times each participant touched the person-like illustration was calculated for each activity or inactivity. Among the body parts, the value of activity or inactivity of the left chest (heart) was used as an index of the atmosphere.

Space marriage questions: The participants were instructed: "What would you like to do in this room? Please select one from the following". Then, the participants were asked to select one of the following seven options: "housework", "meals", "conversation", "sleep", "schoolwork", "sports", and "leisure activities". The participants were also instructed: "What kind of shop do you think the space of this room would be suitable for? Please select one from the following". Then, the participants were asked to select one of the following seven items: "cafe", "family restaurant", "school cafeteria", "fast food restaurant", "bistro", "steakhouse", and "bar".

In this experiment, the indices described above were used to evaluate the atmospheres. In addition, to check whether the automatically generated parameters reflect the atmosphere of each cluster, the participants were also asked to answer an atmosphere question (the participants were instructed: "Please select one atmosphere from the following that best describes the mood of this room", and were asked to select one of the following seven options: an "atmosphere that motivates you because someone seems to be watching you (atmosphere of tense feeling)"; an "atmosphere that energizes you"; an "atmosphere that makes you feel as if you are taking a deep breath"; an "atmosphere that makes you feel lonely but romantic"; an "atmosphere that makes you take a new step"; an "atmosphere that makes you comfortable as if you were being hugged (atmosphere of feeling embraced)"; and an "atmosphere that increases your sensitivity to sensations in your daily life that you are likely to forget".

(Experimental Results)

First, the atmosphere question was analyzed to check whether the automatically generated parameters successfully reflected the atmosphere of each cluster. A binomial test was conducted on each cluster to determine whether the percentage of participants selecting the corresponding atmosphere exceeded the chance level. As a result, for the cluster 3, the "atmosphere that energizes you" was selected by a significantly higher percentage of participants than the chance level (p=0.04). Also for the cluster 4, the "atmosphere that makes you comfortable as if you were being hugged" was selected by a significantly higher percentage of participants than the chance level (p=0.0001). These results indicate that the automatically generated parameters for the clusters 3 and 4 successfully reflected the atmospheres of the respective clusters. For the cluster 1, however, it is indicated that the "atmosphere that increases your sensitivity to sensations in your daily life that you are likely to forget", rather than the "atmosphere of tense feeling", was selected by a significantly high percentage of participants (p=0.04).

Next, principal component analysis was performed for the SD method questions. As a result, two components having eigenvalues greater than or equal to 1.0 were extracted (Table 3). The contribution of the first component was 54.32% (eigenvalue=3.80), and the contribution of the second component was 20.54% (eigenvalue=1.44). The cumulative contribution was 74.86%. One-factor analysis of variance having correspondences was performed on principal component scores, with four clusters as independent variables. As a result, only the first component showed a main effect of clusters (F(3, 81)=10.61, p=0.0001, $\eta^2$=0.28). The results of multiple comparisons indicate that the "atmosphere of feeling embraced" has a significantly higher value than the "atmosphere of tense feeling" (p=0.0001) and has a significantly higher value than the "atmosphere of feeling energized" (p=0.0001). That is, it is suggested that the participants felt that the presented "atmosphere cluster of feeling embraced" was the most comfortable.

Next, results will be described for the questions for onomatopoeic pairs as a new index. As a result of principal component analysis also performed for the questions for onomatopoeia, three components having eigenvalues greater than or equal to 1.0 were extracted. The contribution of the first component was 32.44% (eigenvalue=3.24), the contribution of the second component was 14.79% (eigenvalue=1.48), and the contribution of the third component was 10.48% (eigenvalue=1.05). The cumulative contribution was 57.71%

TABLE 3

| Onomatopoeic pair | Component 1 | Component 2 | Component 3 |
|---|---|---|---|
| Zara-zara vs. Fuka-fuka (Coarse vs. Fluffy) | −0.805 | −0.135 | 0.056 |
| Pasa-pasa vs. Puru-puru (Dry vs. Jiggly) | −0.748 | 0.338 | 0.073 |
| Sube-sube vs. Kasa-kasa (Smooth vs. Dry) | 0.722 | −0.411 | 0.154 |
| Suru-suru vs. shori-shori (Smooth vs. grainy) | 0.641 | 0.121 | 0.015 |
| Moko-moko vs. Tsubu-tsubu (Fluffy vs. Grainy) | 0.603 | 0.375 | 0.262 |
| Tsuru-tsuru vs. Shaka-shaka (Slippery vs. Rattled) | 0.581 | −0.379 | 0.218 |
| Mosa-mosa vs. Poko-poko (Mossy vs. Lumpy) | −0.483 | −0.044 | 0.344 |
| fuwa-fuwa vs. Sara-sara (Fluffy vs. smooth) | 0.294 | 0.629 | 0.115 |
| Howa-howa vs. funi-funi (Fluffy vs. Limp) | 0.283 | 0.448 | −0.695 |
| Chiku-chiku vs. Gasa-gasa (Prickling vs. leathery) | −0.045 | −0.530 | −0.534 |

The results of calculating correlations between the components of the onomatopoeic pairs and the components of the items about the SD method show a moderate positive correlation in the first component (r=0.50, p=0.0001). That is, it is indicated that "uncomfortable vs. comfortable" can be measured even using onomatopoeic pairs. For the second component and the third component, in contrast, there was no relationship with the components of the items about the SD method. That is, with onomatopoeic pairs, axes that could not be captured with the existing SD method can have been extracted. In addition, the results of calculating correlations between the three components of the onomatopoeic pairs and the parameters of the 12 elements indicate that the first component has a relationship with the randomness of movement of the circles as a parameter (r=−0.24, p=0.01) and that the second component has a relationship with the number of circles (r=0.20, p=0.03) and the color (B) of the circles (r=−0.20, p=0.04).

Next, the body map was analyzed. The analysis was made using the number of times the participants touched the left chest (heart). For each cluster, the number of times the left chest was touched when the participants considered an increase in activity (hereinafter, activity) or the number of times the left chest was touched when the participants considered a decrease in activity (hereinafter, inactivity) was standardized across participants, and one-factor analysis of variance was performed, with the cluster as the independent variable. Table 4 shows the values of activity and inactivity of each cluster for the left chest.

First, one-factor analysis of variance was performed, with the value of activity as the dependent variable, and as a result, no significant main effect was found across clusters (F(3, 39)=0.33, ns). Then, one-factor analysis of variance was performed, with the value of inactivity as the dependent variable, and as a result, a significant main effect was found across clusters (F(3, 39)=7.11, p=0.001, $\eta^2$=0.35). As a result of multiple comparisons, a significant difference was found between the cluster 3, which was the "atmosphere of feeling energized", and the cluster 4, which was the "atmosphere of feeling embraced" (p=0.01). That is, it is indicated that although there is no difference in activity in the left chest across clusters, for inactivity, different influences are exerted on body parts as a result of presenting automatically generated clusters.

TABLE 4

|  | Activity | | Inactivity | |
| --- | --- | --- | --- | --- |
|  | M | (SD) | M | (SD) |
| Cluster 1 (Tense) | 0.164 | (0.186) | 0.064 | (0.160) |
| Cluster 2 | 0.133 | (0.158) | 0.061 | (0.087) |
| Cluster 3 (Energized) | 0.192 | (0.216) | 0.004 | (0.017) |
| Cluster 4 (Embraced) | 0.126 | (0.191) | 0.206 | (0.168) |

Figure 21:
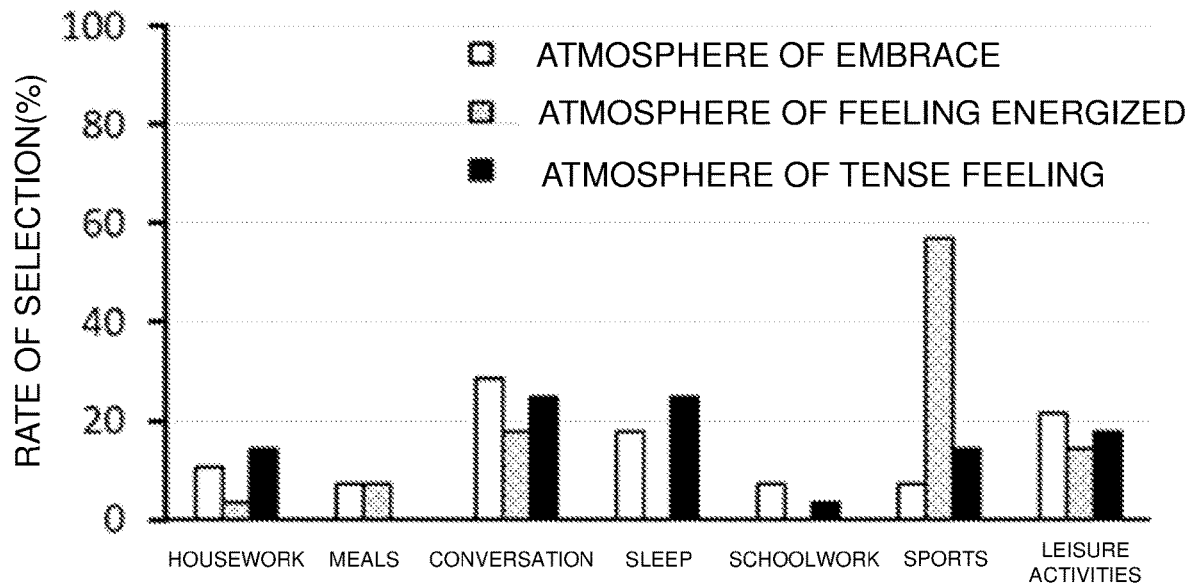
FIG. 21 is a diagram illustrating a result obtained through an evaluation experiment of automatically generated clusters.

Next, the space marriage was analyzed. Regarding the space marriage, two questions were asked: "What do you want to do in this space? Please select one from the following" and "What kind of shop do you think this room space would be suitable for? Please select one from the following". First, regarding "What do you want to do in this space?", the rate of selection for each cluster is illustrated in FIG. 21.

A binomial test was conducted to determine whether the percentage of selection of each atmosphere exceeded the chance level. As a result, the cluster 3, which was the "atmosphere of feeling energized", was selected by a significantly high percentage of participants in the case of "wanting to play sports" (p=0.0001). In the case of "wanting to make a conversation, an interaction, or a connection", the cluster 4, which was the "atmosphere of feeling embraced", was selected by a significantly high percentage of participants (p=0.04).

Figure 22:
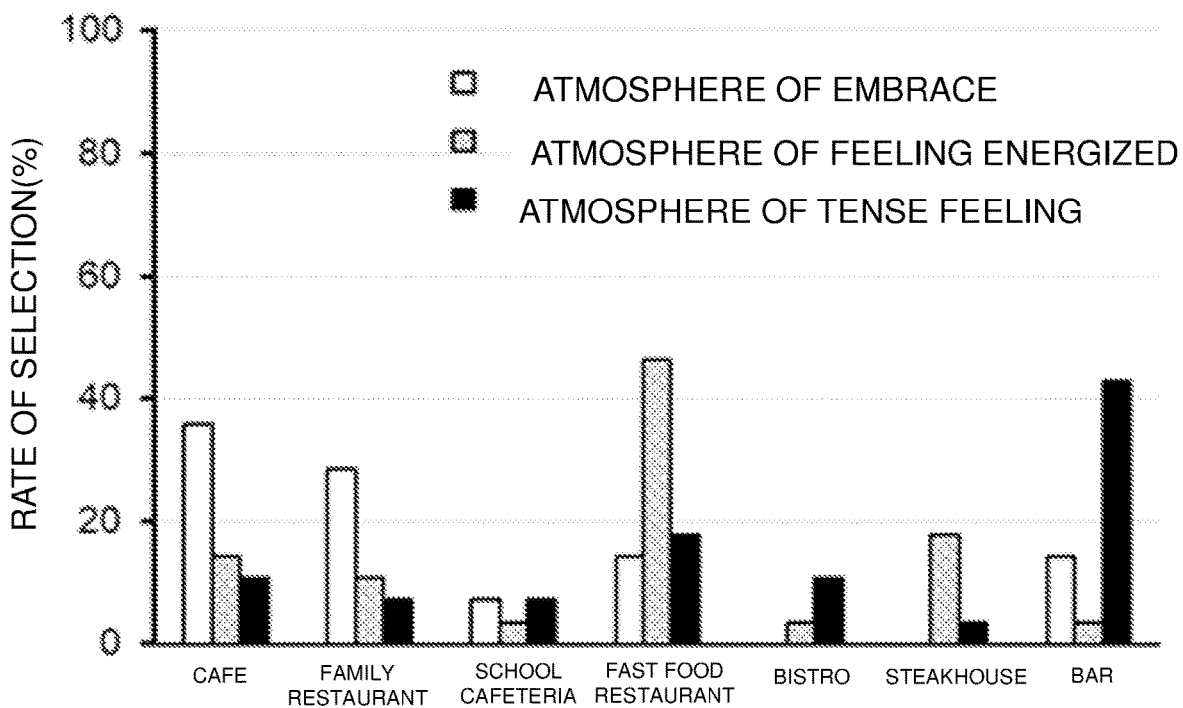
FIG. 22 is a diagram illustrating a result obtained through an evaluation experiment of automatically generated clusters.

Next, likewise, a binomial test was conducted for "What kind of shop do you think this space would be suitable for?". As a result, the cluster 3, which was the "atmosphere of feeling energized", was selected by a significantly high percentage of participants for "fast food restaurant" (p=0.0001). The cluster 4, which was the "atmosphere of feeling embraced", was selected by a significantly high percentage of participants for "café" and "family restaurant" (in sequence, p=0.004; p=0.04). Further, the cluster 1, which was the "atmosphere of tense feeling", was selected by a significantly high percentage of participants for "bar" (p=0.0001; FIG. 22).

These results indicate that, according to the automatically generated parameters, the impressions received by the participants differ for each atmosphere and that there are differences in daily activities and meal-serving shops that are suitable for the atmospheres.

(3) Tactile Sensation Selection Device (3-1) Configuration

The tactile sensation selection device 80 given below can be used as part or all of the environment recognition device 70 described above.

Figure 16:
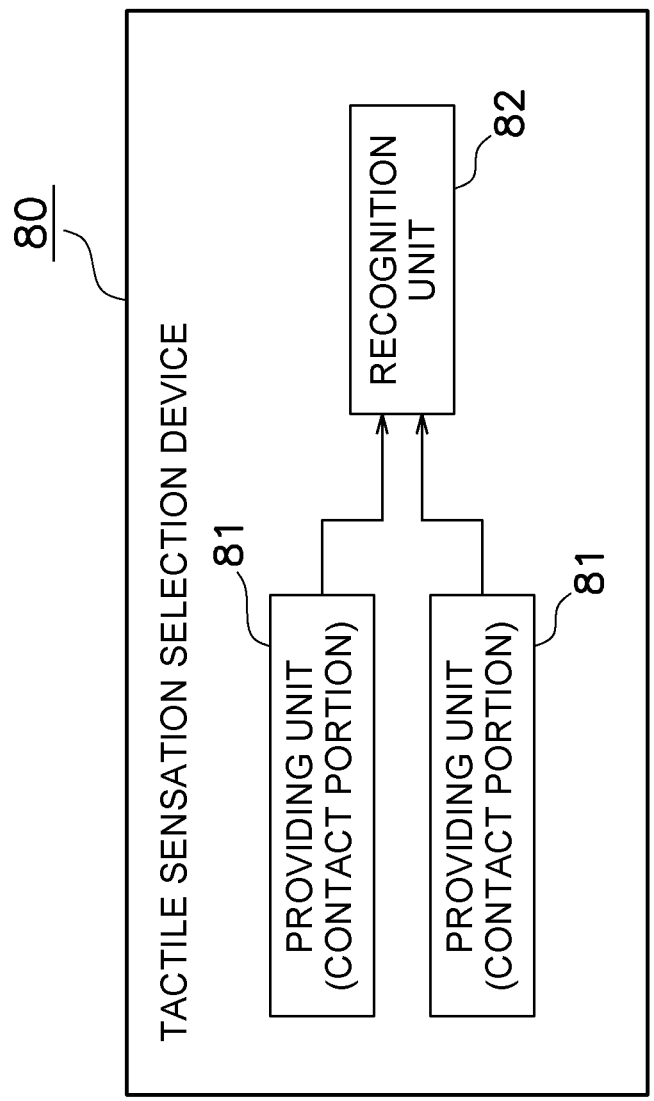
FIG. 16 is a schematic diagram for describing a configuration of a tactile sensation selection device 80 serving as an environment recognition device.
Figure 17:
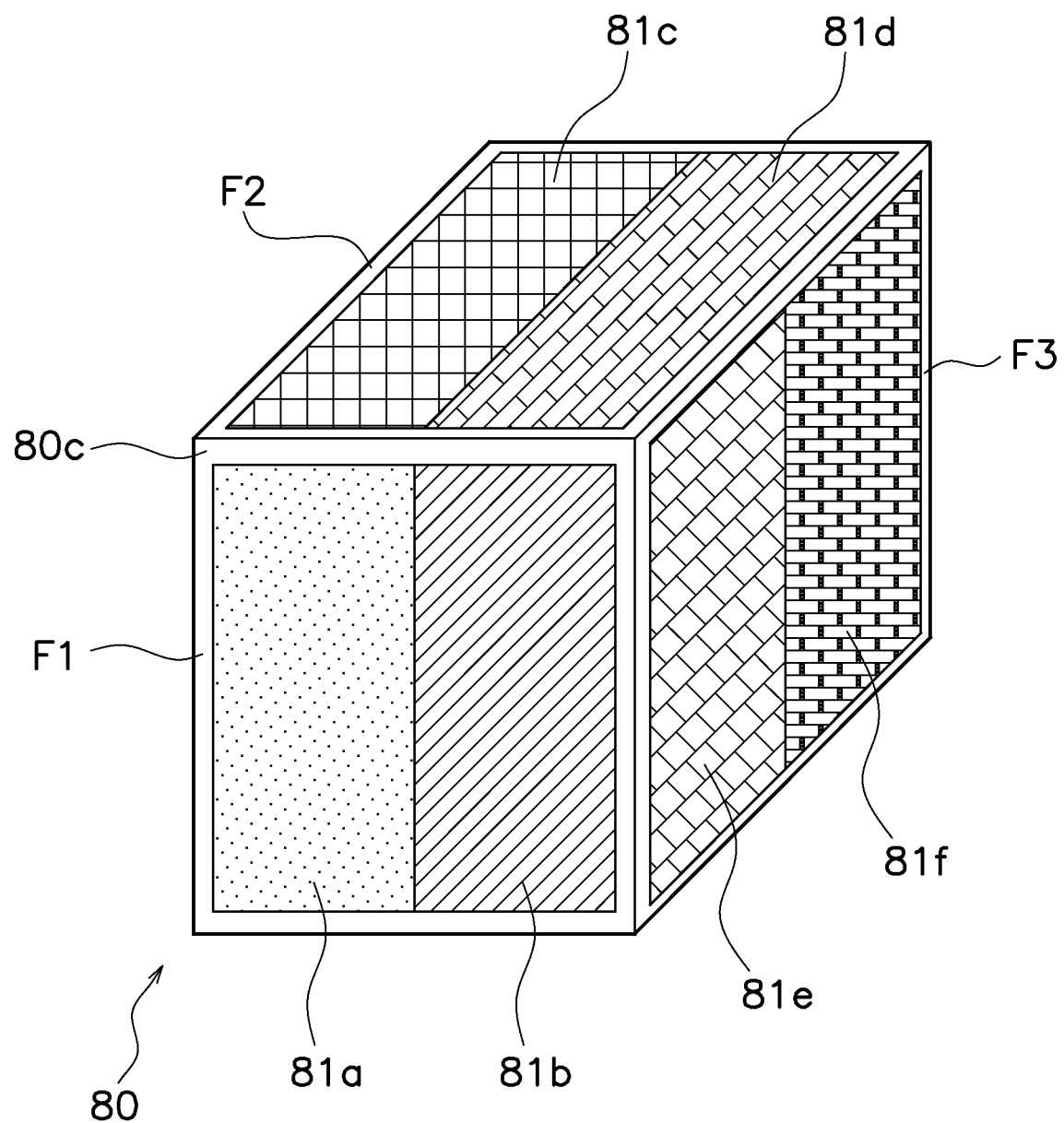
FIG. 17 is a schematic diagram for describing an example of an external appearance of the tactile sensation selection device 80 serving as an environment recognition device.

As illustrated in FIG. 16, the tactile sensation selection device 80 includes providing units 81 and a recognition unit 82. The providing units 81 include a plurality of contact portions 81a, 81b, 81c, 81d, 81e, 81f, etc. Specifically, as illustrated in FIG. 17, the tactile sensation selection device 80 has a rectangular parallelepiped casing 80c having the plurality of contact portions 81a, 81b, 81c, 81d, 81e, 81f, etc. on surfaces thereof. FIG. 17 is a schematic diagram for describing an example external appearance of the tactile sensation selection device 80.

The providing units 81 individually provide different tactile sensations when the user 5 touches them. Examples of the different tactile sensations include a smooth feel (slippery feel), a rough feel (coarse feel), and a soft feel (fluffy feel), etc. These tactile sensations can be given by, for example, arrangement of a snake skin, a tatami mat, a feather, and the like. In short, at least two contact portions of the providing units 81 are formed of different materials. However, the configuration of the contact portions is not limited to this, and at least two contact portions among the plurality of contact portions 81 may generate different vibrations on the contact surfaces. For example, contact portions having a piezoelectric element that converts voltage into force can generate vibrations on the contact surfaces. Alternatively, at least two contact portions among the plurality of contact portions 81 may generate different degrees in temperature and/or humidity on the contact surfaces. For example, contact portions having a Peltier element can change the temperatures of the contact surfaces. Alternatively, at least two contact portions among the plurality of contact portions 81 may generate different voltages and/or currents on the contact surfaces. For example, contact portions having an electrode that applies voltage can be employed. Alternatively, at least two contact portions among the plurality of contact portions 81 may generate different magnetic forces on the contact surfaces in response to, for example, movement of magnetic powder contained in a member. Alternatively, at least two contact portions among the plurality of contact portions 81 may generate different magnetic forces on the contact surfaces. For example, contact portions having a magnetic elastomer or a magnetic field generation device whose rigidity changes in accordance with an external magnetic field can be employed. The contact portions 81 may have any combination of the configurations described above.

In the example illustrated in FIG. 17, a first surface F1, a second surface F2, and a third surface F3 are provided with the contact portions 81a, 81b, 81c, 81d, 81e, and 81f such that two different tactile sensations are generated on each of the first surface F1, the second surface F2, and the third surface F3. Here, an evaluation axis for a predetermined sensation is determined for each surface, and two contact portions arranged on the same surface have different strengths. For example, rough feels are realized on the first surface F1, the right contact portion 81a provides a strong rough feel, and the left contact portion 81b provides a weak rough feel. Smooth feels are realized on the second surface F2, the right contact portion 81c provides a strong smooth feel, and the left contact portion 81d provides a weak smooth feel. Soft feels are realized on the third surface F3, the contact portion 81e closer to the viewer provides a strong soft feel, and the contact portion 81f farther from the viewer provides a weak soft feel.

The recognition unit 82 recognizes the tactile sensation selected by the user 5. Here, the recognition unit 82 recognizes the tactile sensation of the user 5 on the basis of the contact portion with which the user 5 touches. This makes it possible to recognize the tactile sensation corresponding to the state of the environment in the target space S in which the user 5 is present. Additionally, when expressing an individual's feeling, expressing the feeling using a selected tactile sensation may more accurately reflect the sensory orientation (individual difference in orientation on feelings) that an individual internally has than expressing the feeling using language. For example, even when the "warm" feeling is evoked in the user 5 from the surrounding environment, even the user 5 may not be able to recognize whether the "warm" feeling is similar to the "warm" feeling felt when the user 5 touches a blanket or the "warm" feeling felt when the user 5 touches hot water, and this feeling can only be expressed as "warm" in words. In such a case, expressing the "warm" feeling through selection of a plurality of tactile sensations may more accurately express the feeling of the user 5. On the basis of such knowledge, the recognition unit 82 according to this embodiment analyzes which of the contact portions 81a, 81b, 81c, 81d, 81e, 81f, etc. the user 5 has touched and how the user 5 has touched these contact portions on the basis of the number of contacts and/or the contact duration or the like by the user 5 in the target space S, thereby recognizing the tactile sensation corresponding to the state of the environment in the target space S. The recognition unit 82 is constituted by any processor and a memory.

Figure 18:
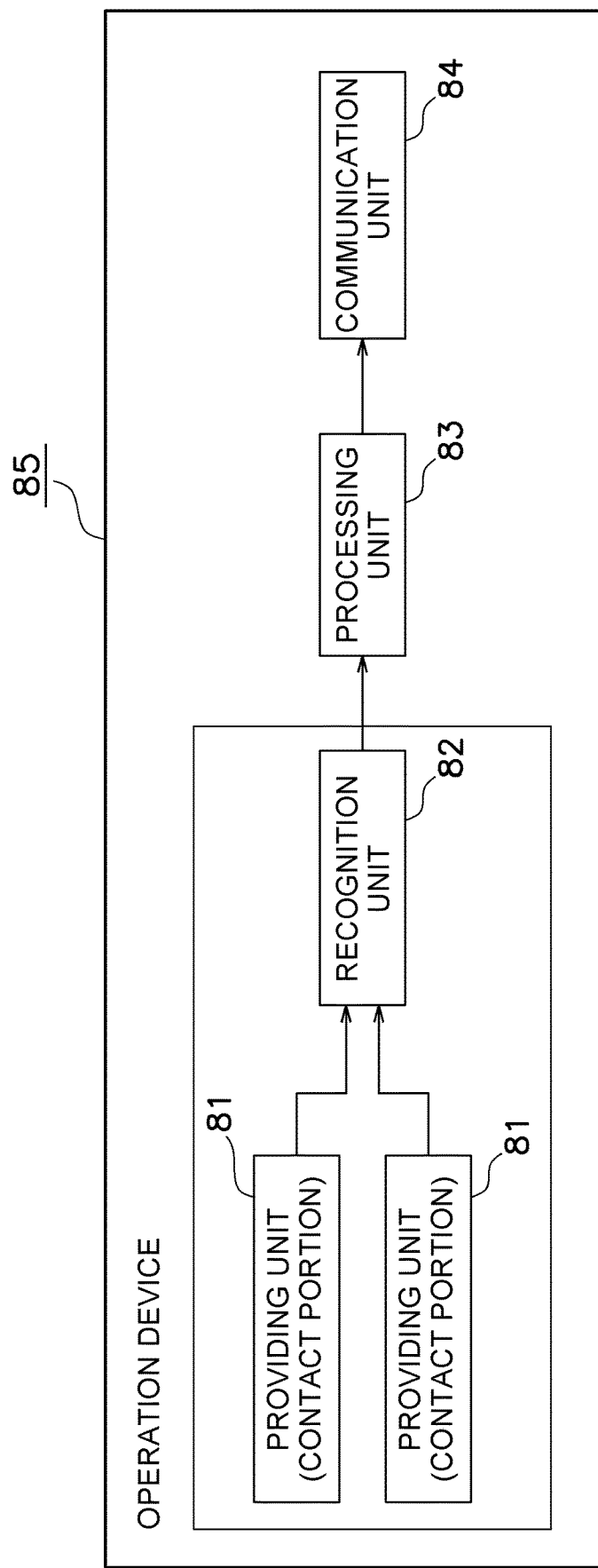
FIG. 18 is a schematic diagram illustrating a configuration of an operation device 85.

FIG. 18 is a schematic diagram illustrating a configuration of the operation device 85. Information indicating the tactile sensation determined by the recognition unit 82 is output to the first cluster classification device 50 and the second cluster classification device 60 via any communication interface.

Further, the operation device 85 of the control device 20, 20X, or 20Y can be constructed using the result of analysis of the tactile sensation by the recognition unit 82. In this case, a processing unit 83 constituted by any processor and a memory determines a tactile sensation in accordance with the conditions of the contact of the user 5 with the plurality of contact portions 81 and other information. Information indicating the determined tactile sensation is transmitted to the control device 20, 20X, or 20Y via a communication unit 84, which is any communication interface, to control the environment generation device 10.

(3-2) Features

As described above, the tactile sensation selection device 80 recognizes a tactile sensation on the basis of a contact portion with which the user has touched. In addition, the tactile sensation selection device 80 is used as part or all of the environment recognition device 70, thereby making it possible to recognize the state of the environment in the target space S on the basis of the difference in tactile sensation. In particular, the contact portions are formed of different materials, thereby making it possible to recognize the state of the environment in the target space S on the basis of the difference in tactile sensation due to the materials. Alternatively, the generation of different vibrations on the contact surfaces of at least two contact portions makes it possible to recognize the state of the environment in the target space S on the basis of the difference in tactile sensation due to the vibrations. Alternatively, the generation of different degrees in temperature and/or humidity on the contact surfaces of at least two contact portions makes it possible to recognize the state of the environment in the target space S on the basis of the difference in tactile sensation due to the temperature and/or humidity. Alternatively, the generation of different voltages and/or currents on the contact surfaces of at least two contact portions makes it possible to recognize the state of the environment in the target space S on the basis of the difference in tactile sensation due to the voltages and/or currents. Alternatively, the generation of different magnetic forces on the contact surfaces of at least two contact portions makes it possible to recognize the state of the environment in the target space S on the basis of the difference in tactile sensation due to the magnetic forces.

In addition, the tactile sensation selection device 80 can be applied and used as the operation device 85 that operates the control device 20, 20X, or 20Y for generating a specific environment in the target space S in accordance with an environmental condition. Specifically, the operation device 85 recognizes the tactile sensation on the basis of the contact portion which the user 5 has touched, and determines the environmental condition corresponding to the tactile sensation. The operation device 85 transmits information indicating the tactile sensation to the control device 20, 20X, or 20Y via the communication unit 84, thereby generating a specific environment in the target space S on the basis of the tactile sensation.

(4) Input Assistance Device (Control of Environment Generation Device)

A means by which the user can express that he or she is "in the mood to receive such a sensory stimulus" by creating the sensory stimulus himself or herself would be able to generate a stimulus that is closer to that given by the user's sensation. This requires a design in which sensory stimuli created by the user are constantly saved in a network-shared database and used to acquire new generative models. However, it is not realistic to implement a system that requires general users with little expertise to create complex sensory stimuli from the beginning. Accordingly, the following means is conceivable as a means for creating sensory stimuli after setting a common protocol for sensory stimuli as a whole. A wide range of types are conceivable, examples of which include a full-scale builder application on a computer, which is capable of creating sensory stimuli very precisely, a simplified GUI thereof on a touch panel, which can be operated even by a child or an elderly person, and a tactile-sensation interface capable of generating unconscious sensory stimuli by a person's intuitive touch. Preparing such means for generating sensory stimuli makes it possible to reduce the barriers to entry for users to creative activities to a minimum. An ecosystem in which diverse users cooperate with each other via a network and share an agent (a group of generative model group) is built to attempt to increase the number of generative models inside the agent in a sustainable manner. Ideally, it is desirable that new sensory stimuli be actually generated in the ecosystem by the users, without the users being aware of their own creative activities, and mechanically absorbed and stored in the database. In such a design in which an agent is shared by a group of people, the users are brought into contact with new types of sensory stimuli created by strangers through the agent, whereby the latent creativity of the users is activated. If it is possible to build an ecosystem with a high degree of openness in which a chain of serendipity is generated such that the seeds of new creation are developed, then the agent can continue to acquire new generative models in a sustainable manner.

In view of the above, an example will be described for an input assistance device having an interface that enables intuitive operation when the terminal device 30 described above inputs an environmental condition to the control device 20X or 20Y. The input assistance device may be implemented by a program installed into the terminal device 30. Examples of the interface that enables intuitive operation will be given below.

(4-1) First Example

In a first example, an input assistance device is configured to be capable of determining an environmental condition for moving a predetermined display object across the wall surface of the target space S via a projector that constitutes the environment generation device 10. For example, in response to the user 5 operating the terminal device 30, the environment generation device 10 displays the display object R on the wall surface of the target space S (see FIGS. 1 and 5). The terminal device 30 has installed therein the function of the input assistance device and is configured to receive adjustment information for adjusting the number of points of the display object R, the moving direction, moving speed, size, color, shape, arrangement of the points, the periodic motion and the like of the points. Accordingly, the user 5 inputs the adjustment information to the terminal device (input assistance device) 30, thereby being able to change the display style of the display object R displayed on the wall surface of the target space S.

It is considered that when the display object R moves upward more than downward, a more positive impression is given to people. It is also considered that when the display object R moves to the right more than to the left, a more positive impression is given to people.

The terminal device 30 may include the tactile sensation selection device 80. In this case, as described above, the parameters for the environmental conditions can be changed in accordance with the conditions of the user 5 touching the plurality of contact portions 81 of the tactile sensation selection device 80. The conditions of the touch include, for example, which surface of the contact portions 81 the user 5 has touched, the strength of the touch when the user 5 touched the surface, the direction of the touched surface, and the frequency of touch. On the basis of the conditions of the touch, the parameters for the environmental conditions can be changed to change the number, moving direction, size, color, shape, and so on of points of the display object R.

(4-2) Second Example (4-2-1) Screen Interface

In a second example, an input assistance device is configured to be capable of moving a predetermined display object across the screen and determining an environmental condition in response to the movement of the display object. The input assistance device is also configured to be capable of controlling the environment generation device 10 under the determined environmental condition.

Figure 19:
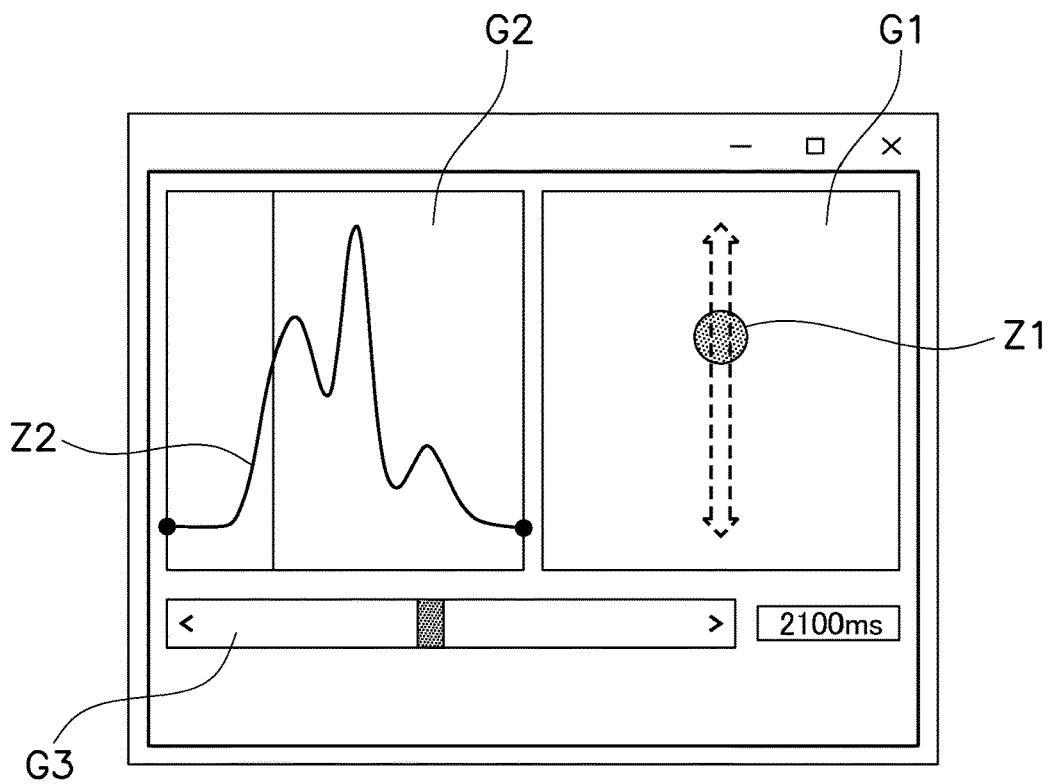
FIG. 19 is a schematic diagram illustrating an example of an interface of an input assistance device.

For example, the input assistance device has an interface having a configuration as illustrated in FIG. 19. Here, a round display object Z1 is displayed in a right region G1 of the screen of the input assistance device. In this interface, when the user 5 draws a curved line Z2 using a mouse, a touch screen, or the like in a left region G2 of the screen illustrated in FIG. 19, the round display object Z1 displayed in the right region G1 moves up and down with one degree of freedom for a predetermined time in accordance with the curved line Z2. In the left region G2 illustrated in FIG. 19, the vertical axis indicates the up and down movements, and the horizontal axis indicates time. Further, changing the length of a scroll bar G3 in a lower portion can change the time during which the round display object Z1 moves, whenever necessary. This interface enables anyone to intuitively create various movements. As a result, the use of the input assistance device using such an interface makes it possible to extract and generate an environmental condition that reflects the sensations shared by a group of people.

(4-2-2) Experimental Example

The classification of environmental conditions using the input assistance device will be supplemented with an experimental example.

In this experiment, each of 53 adult participants with various backgrounds was instructed to create curved lines to freely express five movements, including "P1: a happy creature movement", "P2: a sad creature movement", "P3: a relaxed creature movement", "P4: a tense creature movement", and "P5: an abiotic movement", with the curved lines by using the input assistance device without any preconceptions.

Figure 20:
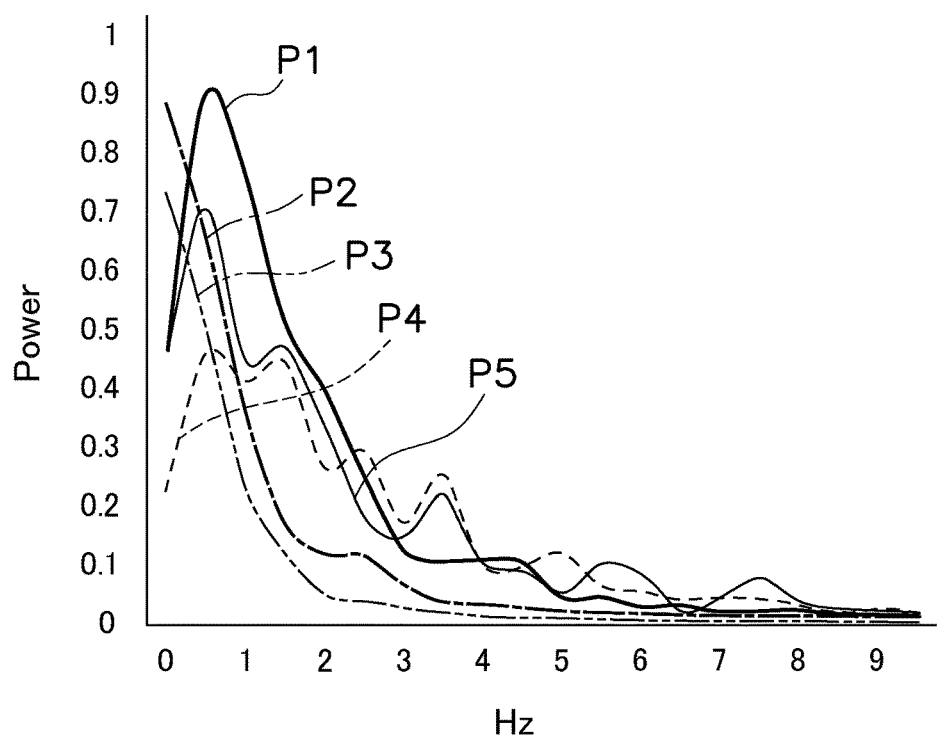
FIG. 20 is a diagram illustrating a result of an experiment performed using the input assistance device.

Then, the curved lines created by each participant imagining the five movements were considered as waveforms and were individually subjected to a Fourier transform. The average power spectrum of the 53 participants for each type of movement was determined, and results illustrated in FIG. 20 are obtained. As can be seen from the results, although each participant freely designed the movements without any preconceptions, features common to the participants for each type of movement were observed on the power spectrum. This suggests that while many participants perform intuitive design, a sensory orientation shared among individuals can be extracted.

Accordingly, the use of an input assistance device having an intuitive interface as described above facilitates the setting of clusters of environmental conditions for generating an environment that reflects the sensory orientation shared among individuals.

Other Embodiments

While the embodiments have been described, it will be understood that various changes in form and details may be made without departing from the spirit and scope of the claims.

The present disclosure is not limited directly to the embodiments described above. The present disclosure can be embodied by modifying the constituent elements without departing from the gist thereof in the implementation stage. In addition, the present disclosure can form various disclosures by appropriately combining a plurality of constituent elements disclosed in each of the embodiments. For example, some constituent elements may be deleted from the constituent elements given in the embodiments. Furthermore, constituent elements may be appropriately combined in different embodiments.

What is claimed is:

1. A cluster classification device comprising:
a first processor; and
a memory,
the first processor being configured to
acquire two or more environmental conditions during a period of time, each of the environmental conditions being a condition for generating a specific environment in a target space where a person can be present, and
generate a cluster based on features of the two or more environmental conditions, the cluster being generated from a plurality of environmental conditions among the two or more environmental conditions; and
the memory storing the cluster and a feature of the cluster in association with each other.

2. The cluster classification device according to claim 1, wherein
the first processor is further configured to set the feature of the cluster.

3. The cluster classification device according to claim 2, wherein
the first processor is further configured to
acquire a reaction of a person present in the target space, and set the feature of the cluster based on the reaction acquired.

4. The cluster classification device according to claim 2, wherein
the environmental condition is a parameter usable to characterize a physical quantity that exerts a specific influence on at least one of a body and a mind of a person.

5. The cluster classification device according to claim 2, wherein
the cluster is formed of a group of environmental conditions or a region including environmental conditions in a space expressed by n-dimensional information.

6. The cluster classification device according to claim 1, wherein
the first processor is further configured to acquire an environmental condition for generating, in the target space, a defined environment having a concept that is defined in advance.

7. The cluster classification device according to claim 6, wherein
the first processor is further configured to
acquire a reaction of a person present in the target space, and
classify the environmental condition into a specific cluster in accordance with the concept of the defined environment and the reaction acquired.

8. The cluster classification device according to claim 6, wherein
the environmental condition is a parameter usable to characterize a physical quantity that exerts a specific influence on at least one of a body and a mind of a person.

9. The cluster classification device according to claim 6, wherein
the cluster is formed of a group of environmental conditions or a region including environmental conditions in a space expressed by n-dimensional information.

10. The cluster classification device according to claim 1, wherein
the environmental condition is a parameter usable to characterize a physical quantity that exerts a specific influence on at least one of a body and a mind of a person.

11. The cluster classification device according to claim 1, wherein
the cluster is formed of a group of environmental conditions or a region including environmental conditions in a space expressed by n-dimensional information.

12. An environment generation device including the cluster classification device according to claim 1, the environment generation device being configured to generate the specific environment in the target space.

13. An environment generation system including the cluster classification device according to claim 1, the environment generation system further comprising:
a control device configured to control an environment generation device that generates the specific environment in the target space,
the control device including a second processor configured to
receive an input corresponding to the feature of the cluster, and
control the environment generation device in accordance with one of the plurality of environmental conditions belonging to the cluster.

14. The environment generation system according to claim 13, wherein
the second processor is further configured to
select an environmental condition from the plurality of environmental conditions belonging to the cluster, and
control the environment generation device in accordance with the environmental condition selected.

15. The environment generation system according to claim 14, wherein
the second processor is further configured to select another environmental condition belonging to the same cluster under a predetermined condition.

16. The environment generation system according to claim 14, wherein
the second processor is further configured to
acquire a reaction of a person present in the target space, and
select another environmental condition belonging to the same cluster when the reaction acquired does not satisfy a preset condition.

17. The environment generation system according to claim 14, wherein
the second processor is further configured to
determine a priority of the environmental conditions belonging to the cluster based on at least one of a number of selections of the environmental condition and a reaction of a person present in the target space, and
select the environmental condition in accordance with the priority.

18. The cluster classification device according to claim 1, wherein
the first processor is configured to generate a plurality of clusters, each cluster of the plurality of clusters being generated from a different plurality of environmental conditions among the two or more environmental conditions,
the memory storing each cluster of the plurality of clusters in association with a feature, the feature associated with each cluster of the plurality of clusters being different.

19. An environment generation system including the cluster classification device according to claim 18, the environment generation system further comprising:
a control device configured to control an environment generation device,
the control device including a second processor configured to
receive an input corresponding to the feature associated with one cluster among the plurality of clusters, and
control the environment generation device in accordance with one of the plurality of environmental conditions belonging to the one cluster.

* * * * *